(12) United States Patent
Kurahashi et al.

(10) Patent No.: US 7,932,874 B2
(45) Date of Patent: Apr. 26, 2011

(54) DISPLAY DEVICE

(75) Inventors: Nagatoshi Kurahashi, Ooamishirasato (JP); Takayuki Ota, Ooamishirasato (JP); Shimon Itakura, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 978 days.

(21) Appl. No.: 11/481,824

(22) Filed: Jul. 7, 2006

(65) Prior Publication Data
US 2007/0008240 A1   Jan. 11, 2007

(30) Foreign Application Priority Data

Jul. 8, 2005   (JP) .................................. 2005-200334

(51) Int. Cl.
*G09G 5/00* (2006.01)
(52) U.S. Cl. ................... 345/6; 345/32; 348/42; 349/15
(58) Field of Classification Search .................. 345/6–9, 345/1.3, 2.2, 3.1, 87, 82, 102, 419–422; 359/463, 359/464, 465, 53, 98, 738; 348/42–60; 349/15, 349/64, 70; 340/716; 362/561, 611–615
See application file for complete search history.

(56) References Cited

U.S. PATENT DOCUMENTS

| | | | | |
|---|---|---|---|---|
| 4,843,381 | A | * | 6/1989 | Baron ............................. 345/88 |
| 5,299,039 | A | * | 3/1994 | Bohannon ......................... 349/6 |
| 5,745,197 | A | * | 4/1998 | Leung et al. .................... 349/77 |
| 5,945,965 | A | * | 8/1999 | Inoguchi et al. .................. 345/6 |
| 6,262,694 | B1 | * | 7/2001 | Ishimoto et al. ............... 345/1.1 |
| 6,525,699 | B1 | * | 2/2003 | Suyama et al. .................... 345/6 |
| 6,906,762 | B1 | * | 6/2005 | Witehira et al. ................ 349/73 |
| 7,068,252 | B2 | * | 6/2006 | Hattori et al. .................... 345/87 |
| 7,705,934 | B2 | * | 4/2010 | Kurahashi et al. .............. 349/78 |
| 2002/0005848 | A1 | * | 1/2002 | Asai et al. ...................... 345/419 |
| 2002/0167531 | A1 | * | 11/2002 | Baudisch ....................... 345/611 |
| 2005/0104801 | A1 | * | 5/2005 | Sugiura ............................. 345/5 |
| 2005/0206582 | A1 | * | 9/2005 | Bell et al. .......................... 345/6 |

FOREIGN PATENT DOCUMENTS

JP   200214566 A  *  7/2002

* cited by examiner

*Primary Examiner* — Alexander Eisen
*Assistant Examiner* — Patrick Marinelli
(74) *Attorney, Agent, or Firm* — Stites & Harbison PLLC; Juan Carlos A. Marquez, Esq.

(57) ABSTRACT

The present invention aims at the lowering of an image quality of an outer peripheral portion of an image display region. For this end, in a display device in which a plurality of display panels are arranged from a front side to a depth side in an overlapped manner and an image is displayed on the respective display panels, the respective display panels have regions which allow the image to be displayed thereon (image display regions) broadened toward the depth-side display panel from the front-side display panel.

6 Claims, 18 Drawing Sheets

DISPLAY DEVICE

CROSS-REFERENCE TO RELATED APPLICATIONS

The disclosure of Japanese Patent Application No. 2005-200334 filed on Jul. 8, 2005 including the specification, drawings and an abstract is incorporated herein by reference in its entirety.

BACKGROUND

1. Field of the Invention

The present invention relates to a display device. The invention particularly relates to a three-dimensional display device, a three-dimensional display system and a three-dimensional display method, and more particularly relates to a three-dimensional display device of a DFD (Depth Fused 3D) type which arranges a plurality of display panels (display screens) in the depth direction in an overlapped manner, and a technique which is effectively applicable to a display method of a three-dimensional image using the three-dimensional display device.

2. Description of Related Arts

Conventionally, as a three-dimensional display device which displays a three-dimensional image such as a three-dimensional stereoscopic image of an object or an image which arranges a plurality of objects three-dimensionally, there has been known a DFD-type display device.

A DFD-type display device is a three-dimensional display device which arranges a plurality of display panels (display screens) at different depth positions as viewed from a viewer of the display device (for example, Japanese Patent Laid-open No. 2002-214566 (patent document 1)). In the three-dimensional display device described in the patent document 1 or the like, two-dimensional images which are obtained by projecting an object to be displayed on the respective display screens from the viewing direction of the viewer are generated, and are displayed on the respective display screens. Here, the transmissivities of the two-dimensional images displayed on the respective display screens as viewed from the viewer are respectively independently changed for respective display screens thus generating a three-dimensional stereoscopic image.

Here, in the display device having two display panels, when a three-dimensional stereoscopic image is displayed in this manner, for example, the transmissivity of the front-side display panel as viewed from the viewer is set such that the brightness of the two-dimensional image which is displayed on the front-side display panel becomes equal to the brightness of the object to be displayed, and the transmissivity of the depth-side display panel as viewed from the viewer is set to a maximum value of the display panel, for example. Due to such a constitution, it appears to the viewer as if the object to be displayed is displayed on the front-side display panel. Further, by slightly increasing the transmissivity of the front-side display panel and by slightly decreasing the transmissivity of the depth-side display panel, it appears to the viewer as if the object to be displayed is displayed at a depth position corresponding to a rate of transmissivities of the respective display panels. In this manner, in the above-mentioned DFD-type display device, it is possible to display an image of the object at the arbitrary depth position between the display panels by independently changing the transmissivity of the front-side display panel and the transmissivity of the depth-side display panel from each other so as to change a ratio between the transmissivities thereof.

The three-dimensional DFD-type display device allows the viewer to view the three-dimensional stereoscopic image without using particular glasses for stereoscopic observation such as a liquid crystal shutter glass, for example, thus suppressing the contradiction among physiological factors in stereoscopic vision.

SUMMARY

In the conventional DFD-type three-dimensional display device, usually, all of the plurality of display panels has the same constitution, wherein these display panels have the same one-pixel size, the same pixel pitch and the same image display region area which can display a two-dimensional image. Accordingly, when two display panels are viewed from a viewing point of the viewer, for example, an image angle of the image display region of the front-side display panel and an image angle of the image display region of the depth-side display panel differ from each other.

That is, in the conventional DFD-type three-dimensional display device, for example, as shown in FIG. 19, in the outer periphery of an image display region L1 of a front-side display panel 101, there exists a region L3 where a two-dimensional image for providing a three-dimensional stereoscopic image cannot be displayed.

However, in the display method of the three-dimensional stereoscopic image which uses the conventional DFD-type three-dimensional display device, in generating data of a two-dimensional image which is displayed on the front-side display panel, image data which is displayed by a whole image display region L1 including the region L3 where the two-dimensional image for providing the three-dimensional stereoscopic image is not displayed is generated. Accordingly, when the two-dimensional image which is displayed on each display panel is viewed from the viewing point of the viewer, for example, in the region L3 of the front-side display panel 101 where the two-dimensional image for providing the three-dimensional stereoscopic image cannot be displayed, it appears as if a frame-like image is displayed or a black matrix (BM) region 102a of the depth-side display panel 102 is viewed in a see-through manner. Accordingly, there has been a drawback that a stereoscopic feeling is lowered in an outer peripheral portion of the image display region or an image quality is lowered.

It is an object of the invention to provide, in a display device, and more particularly in a DFD-type three-dimensional display device or a three-dimensional display system, a technique which can prevent the lowering of a stereoscopic feeling or an image quality of an image displayed on an outer peripheral portion of a display panel.

The above-mentioned and other objects and novel features of the invention will become apparent by the description of the specification and attached drawings.

The display device, and more particularly a three-dimensional display device and a three-dimensional display method of the invention are applicable to, for example, a DFD-type three-dimensional display device, wherein the display device and the display method are mostly characterized in that image display regions of the plurality of display panels are broadened toward the depth-side display panel from the front-side display panel as viewed from a viewer. Here, the image display regions of the respective display panels may actually differ in area or, for example, an apparent image display region may be narrowed by performing a black display of an outer peripheral portion of the front-side display panel. To explain typical constitutional examples of the display device having such a feature, they are as follows.

(1) In a display device in which a plurality of display panels is arranged from a front side to a depth side in an overlapped manner and an image is displayed on the respective display panels, the respective display panels have regions which allow the image to be displayed thereon (image display regions) broadened toward the depth-side display panel from the front-side display panel.

(2) In the display device according to the means (1), the respective display panels are equal to each other with respect to the size of one pixel within the image display region.

(3) In the display device according to the means (1), the respective image display panels are equal to each other with respect to the number of pixels within the image display region.

(4) In the display device having any one of the means (1) to (3), the respective display panels differ from each other with respect to profile sizes thereof and, at the same time, the profile sizes of the respective display panels are increased toward the depth-side display panel from the front-side depth panel.

(5) In the display device having any one of the means (1) to (3), the respective display panels are equal to each other with respect to the profile size of the display panel and widths of black matrix regions which are formed on outer peripheries of the image display regions are broadened toward the front-side display panel from the depth-side display panel.

(6) In a display device in which a plurality of display panels are arranged from a front side to a depth side in an overlapped manner and an image is displayed on the respective display panels, the display means includes a scaling means which narrows the image display region of at least one display panel among the respective display panels in appearance.

(7) In the display device having any one of the means (1) to (6), a three-dimensional stereoscopic image is displayed as a whole by displaying two-dimensional images on the respective display panels.

(8) In a display device in which a plurality of display panels are arranged from a front side to a depth side in an overlapped manner and an image is displayed on the respective display panels, the display device performs a display by scaling down a size of an image of the front-side display panel than a size of the image of the depth-side display panel.

(9) In the display device according to the means (8), a three-dimensional stereoscopic image is displayed as a whole by displaying two-dimensional images on the front-side display panel and the depth-side display panel.

(10) In a display method which provides a three-dimensional stereoscopic image of an object by displaying two-dimensional images of an object on a plurality of display panels which are arranged in an overlapped manner in the depth-side direction as viewed from a viewer, the display method includes a step 1 which generates the two-dimensional images of the object which are displayed on the respective display panels, a step 2 which decreases in appearance an image size of at least one two-dimensional image out of the two-dimensional images which are generated in the step 1, and a step 3 which displays the two-dimensional image which is generated in the step 1 and the two-dimensional image which is obtained by decreasing the image size in appearance in step 2 on the display panel.

(11) In the display method according to the means (10), the step 2 is a display method which changes color of an outer peripheral portion of the two-dimensional image to black.

(12) In the display method according to the means (10) or (11), the step 1 is a display method which generates color information on the respective pixels which express the two-dimensional image and information on transmissivity or brightness of the respective pixels.

The display device, for example, the three-dimensional display device of the invention is, for example, characterized in that, as in the case of means (1), the area of the image display region of the front-side display panel is set narrower than the area of the image display region of the depth-side display panel as viewed from a viewer. Here, it is preferable that the image display regions of the respective display panels have image angles thereof from a preset viewing point set equal to each other. Due to such a constitution, for example, in displaying the two-dimensional images which are generated by projecting an object to the respective display panels from the viewing point, when the three-dimensional display device is viewed from the viewing point, it appears that the three-dimensional stereoscopic image of the object is displayed at the depth position corresponding to the magnitude of transmissivity or brightness of respective points (pixels) of the two-dimensional image. Further, since the image angles of the image display regions of the respective display panels are set equal to each other, it is possible to prevent a phenomenon that a frame-like image appears to be displayed in the vicinity of an outer periphery of the front-side display panel or a BM region of the depth-side display panel is viewed in a see-through manner. Accordingly, when the three-dimensional stereoscopic image is provided, it is possible to prevent the lowering of the stereoscopic feeling or an image quality of the vicinity of the outer periphery of the image display region.

Further, in the display device, for example, the three-dimensional display device of the invention, the respective display panels differ from each other in the area of the image display region. Here, with respect to the pixels within the image display regions of the respective display panels, for example, the size of one pixel within the image display region may be set equal among the respective display panels as in the case of means (2) or the number of pixels within the pixel display region may be set equal among the respective display panels as in the case of means (3). Particularly, by setting the number of pixels within the pixel display region equal among the respective display panels as in the case of means (3), as viewed from the preset viewing point, the image angles of the pixels of the respective display panels become equal to each other. On the other hand, when the size of one pixel within the image display region is set equal among the respective display panels as in the case of means (2), for example, within the image angle of a certain pixel in the front-side display panel, a plurality of pixels of the depth-side display panel or boundaries of the pixels fall. Accordingly, by adopting the constitution according to the means (3), it is possible to reduce a discomfort that a viewer feels when the viewer views the three-dimensional stereoscopic image of the object.

Further, as in the case of the display device, for example, the three-dimensional display device of the invention, in changing the areas of the image display regions of the respective panels, the respective display panels may differ the profile sizes thereof from each other as in the case of the means (4), or the respective display panels may have the equal profile size as in the case of the means (5) and may change the widths of the BM regions formed on the outer peripheries of the image display regions. By adopting the means (4), the display panel having the narrow image display region can decrease the profile size. For example, by allowing the deepest-side display panel to have the same profile size as the conventional display panel, it is possible to achieve the reduction of weight of the three-dimensional display device. On the other hand, by adopting the means (5), for example, it is possible to facilitate the alignment and the mounting operation of the respective display panels in assembling the three-dimensional display device.

Further, the display device, for example, the three-dimensional display device of the invention may, in place of changing the areas of the actual image display regions of the respective display panels shown in the means (1) to the means (5), provide the scaling means such as the means (6), for example, thus decreasing the image display region of the front-side display panel in appearance. Due to such a constitution, for example, in the same manner as the conventional three-dimensional display device, as the respective display panels, it is possible to use the display panels which have the pixel display region of the same area, and the same pixel size and the same number of pixels within the pixel display regions. Accordingly, it is unnecessary to prepare the plurality of display panels which differ in constitution which are described in the means (1) to (5).

Further, in the display device, for example, the three-dimensional display device of means (6), the image display region in appearance is narrowed by the method which performs a black display of the outer peripheral portion of the two-dimensional image which is displayed on the front-side display panel. Accordingly, for example, when the three-dimensional display device is used as in the case of the generally two-dimensional display device and the two-dimensional image is displayed on only the front-side display panel, it is also possible to display the image also on the region where the black display is performed by the scaling means.

Further, although the scaling means is provided to the display device in the means (6), the invention is not limited to such means and, for example, the scaling means may be provided to a two-dimensional image forming device which generates a two-dimensional image to be displayed on the display device.

Further, the display device, for example, the three-dimensional display device of means (1) to (6) is the display device in which, by displaying the two-dimensional image on the respective display panels as in the case of the means (7), the three-dimensional stereoscopic image is displayed as a whole and the display device may have any constitution provided that the display device adopts such a display method.

Further, the display device of the invention, for example, the three-dimensional display device may be the display device having the constitution of the means (7) or (8).

Further, in displaying the three-dimensional stereoscopic image of the object by the display device of the means (6), the display may be performed by the method of the means (10) or the means (11), for example. Here, by generating the information on the transmissivity or brightness of the respective pixels in step 1 as in the case of the means (12), when the two-dimensional images are displayed on the respective panels, it is possible to provide the three-dimensional stereoscopic image of the object at the depth position corresponding to the information on the transmissivity and brightness.

DETAILED DESCRIPTION OF THE INVENTION

Hereinafter, the invention is explained in detail in conjunction with embodiments in conjunction with drawings. Here, in all drawings for explaining the embodiments, parts having identical functions are given same numerals and their repeated explanation is omitted.

In a display device, for example, a DFD-type three-dimensional display device of the invention, a plurality of display panels which are arranged in the depth direction as viewed from a viewer in an overlapped manner respectively differ from each other with respect to an area of an image display region which is used for displaying a two-dimensional image and, at the same time, the image display regions of the respective display panels are broadened toward the depth-side display panel from the front-side display panel as viewed from a viewer. Further, by setting image angles of the image display regions of the respective display panels as viewed from a viewing point of the viewer equal to each other, it is possible to prevent the lowering of a stereoscopic feeling of an image which is generated in the vicinity of an outer peripheral portion of the pixel display region.

Here, although the explanation is made by taking the three-dimensional display device as an example in this specification, the constitution based on a technical concept described in detail hereinafter may be applicable to display devices other than the three-dimensional display device.

Figure 1:
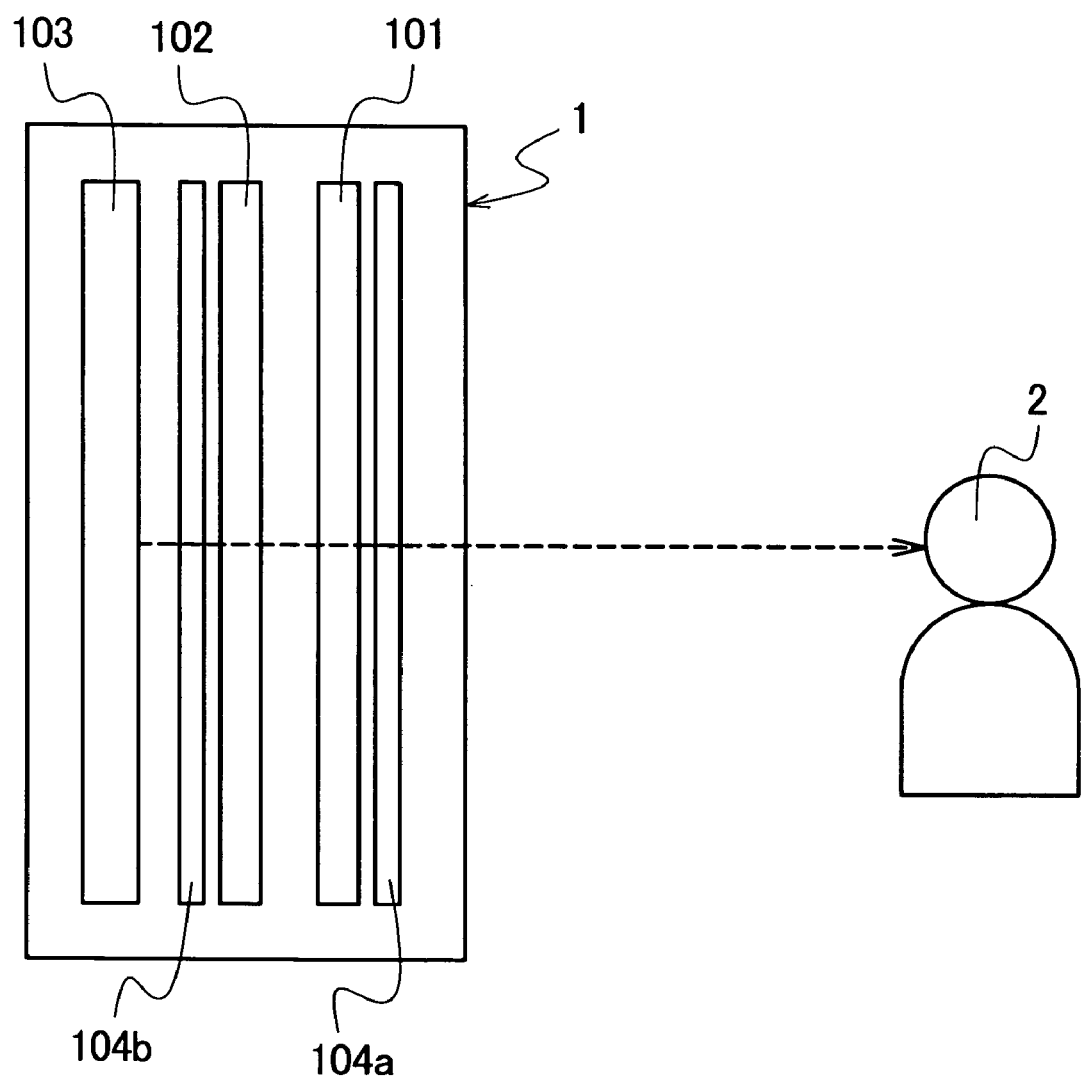
FIG. 1 is a schematic view for explaining the schematic constitution and the display principle of a three-dimensional display device according to the invention, and also is a view showing a constitutional example of the three-dimensional display device.
Figure 2:
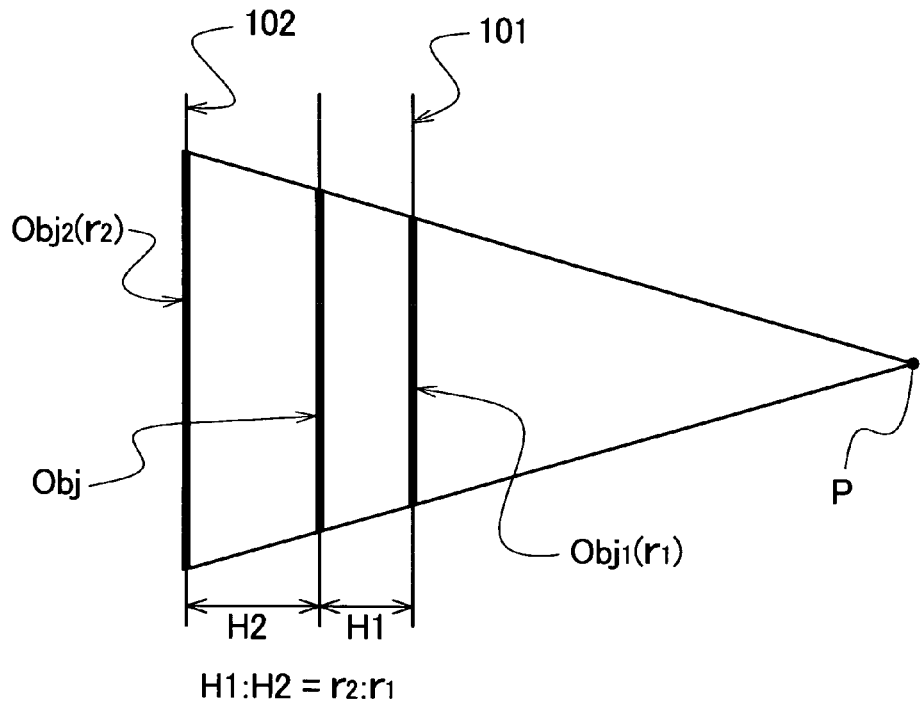
FIG. 2 is a schematic view for explaining the schematic constitution and the display principle of the three-dimensional display device according to the invention, and also is a view for explaining the display principle.

FIG. 1 and FIG. 2 are schematic views for explaining the schematic constitution and the display principle of the three-dimensional display device according to the invention, wherein FIG. 1 is a view showing a constitutional example of the three-dimensional display device, and FIG. 2 is a view for explaining the display principle. In FIG. 1, numeral 1 indicates a three-dimensional display device, numeral 101 indicates a front-side display panel, numeral 102 indicates a depth-side display panel, numeral 103 indicates a light source, numerals 104a, 104b indicate polarizers and numeral 2 indicates a viewer. Further, in FIG. 2, symbol $Obj_1$ indicates a two-dimensional image which is displayed on a front-side display panel, symbol $Obj_2$ indicates a two-dimensional image which is displayed on a depth-side display panel and Obj indicates a three-dimensional stereoscopic image as viewed from a viewing point P of a viewer.

A three-dimensional display device 1 of the invention is a three-dimensional DFD-type display device. The three-dimensional display device 1 includes, for example, as shown in FIG. 1, two display panels 101, 102, a light source 103 and a pair of polarizers 104a, 104b. Here, two display panels 101, 102 are transmissive-type display panels and, as shown in FIG. 1, are arranged to overlap to each other at depth positions which are made different as viewed from the viewer 2. Hereinafter, with respect to these two display panels 101, 102, the front-side display panel 101 as viewed from the viewer 2 is referred to as the front-side display panel and the depth-side display panel 102 as viewed from the viewer 2 is referred to as the depth-side display panel.

Further, the light source 103 is arranged such that light is radiated in the direction toward the front-side display panel 101 from the depth-side display panel 102 as viewed from the viewer 2.

Further, the polarizers 104a, 104b are provided, for example, for increasing the contrasts of the respective display panels 101, 102 and, in a normally black mode, the polarizers 104a, 104b are arranged in a cross-nicol. Further, in a normally white mode, the polarizers 104a, 104b are arranged in a parallel-nicol. Here, in the example shown in FIG. 1, two display panels 101, 102 are arranged between a pair of polarizers 104a, 104b. However, the invention is not limited to such an arrangement and, for example, the front-side display panel 101 may be sandwiched by a pair of polarizers and the depth-side display panel 102 may be sandwiched by another pair of polarizers.

The respective display panels 101, 102 may have any constitution provided that an image (two-dimensional image) is displayed by allowing the light radiated from the light source 103 to pass through or to be blocked for every pixel unit. For example, a liquid crystal display panel is used as such display panels 101, 102. When the liquid crystal display panel is used as the display panels 101, 102, the front-side display panel 101 includes, for example, a TFT substrate which forms TFT elements on a transparent substrate in an array, and a counter substrate which forms color filters of a plurality of colors which express colors of the image thereon. Further, between the TFT substrate and the counter substrate, a liquid crystal material is sealed using a sealing material. Further, the depth-side display panel 102 also includes, in the same manner as the front-side display panel 101, a TFT substrate and a counter substrate, and a liquid crystal material is sealed between the TFT substrate and the counter substrate using a sealing material.

Further, as the light source 103, for example, a fluorescent lamp such as a cold cathode fluorescent tube, a dispersion type electro luminescence (EL), a light emitting diode (LED) or the like may be used.

Further, in the three-dimensional display device 1 of a DFD-type of the invention, the constitution of the above-mentioned display panels 101, 102 and the detailed constitution of other parts may be substantially equal to the constitution of the three-dimensional display device described in the document 1 (Japanese Patent Laid-open 2002-214566), for example, and hence, the detailed explanation of the constitution is omitted in this specification.

The detail of the method for displaying a three-dimensional stereoscopic image of an object or a three-dimensional image which arranges a plurality of objects in a three-dimensional manner using the three-dimensional display device 1 of a DFD-type may be substantially equal to the three-dimensional display method described in the above-mentioned patent document 1 and hence, the detailed explanation of the method is omitted in this specification and the explanation is made briefly only with respect to the display principle.

In displaying a three-dimensional image using the three-dimensional display device 1 of a DFD-type which has two display panels, for example, as shown in FIG. 2, two dimensional images $Obj_1$, $Obj_2$ are formed by projecting an object to be displayed Obj on display panels 101, 102 from a viewing point P of the viewer, and these two dimensional images $Obj_1$, $Obj_2$ are displayed on the respective display panels 101, 102. Here, for example, when the two-dimensional image $Obj_1$ displayed on the front-side display panel 101 is displayed with luminance $γ_1$ and the two-dimensional image $Obj_2$ displayed on the depth-side display panel 102 is displayed with luminance 72, it appears for the viewer which views the display panels 101, 102 from the viewing point P, as if the object to be displayed Obj is displayed between the two display panels 101, 102 and at a depth position corresponding to a ratio of luminance of two-dimensional images of the respective display panels 101, 102.

Figure 19:
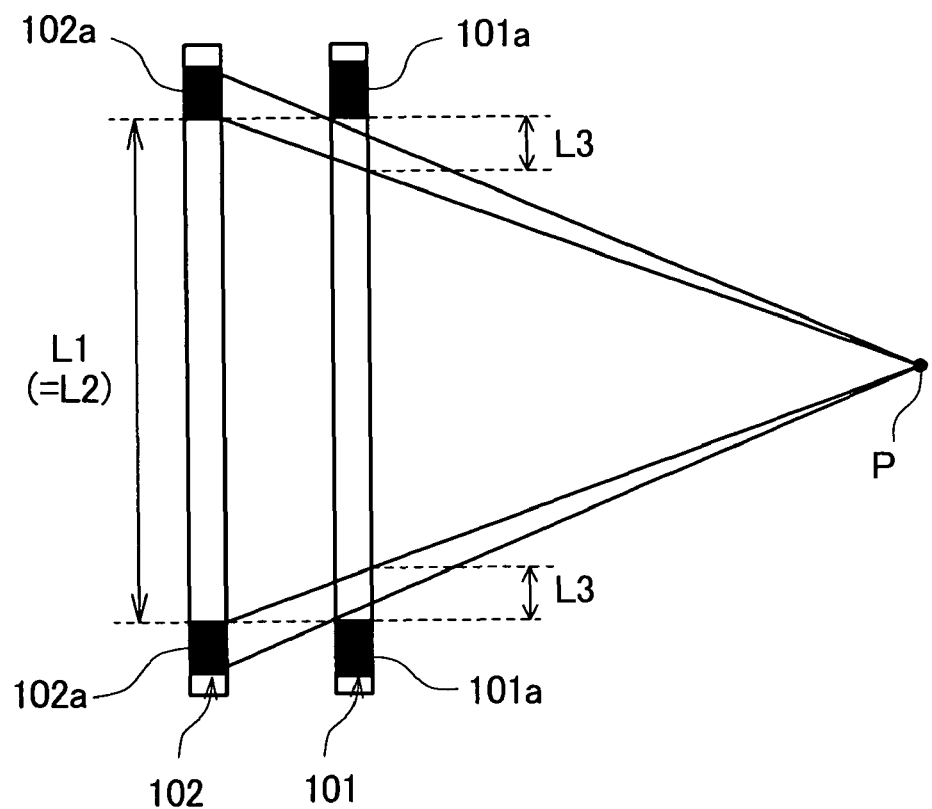
FIG. 19 is a schematic view for explaining problems of a conventional three-dimensional display device.

However, in the conventional DFD-type three-dimensional display device, for example, the respective display panels 101, 102 have the same constitution, that is, the respective display panels 101, 102 are equal with respect to an area of an image display region, a size of a pixel and the number of pixels within the pixel display region. Accordingly, when the viewer 2 views the two-dimensional images which are displayed on the respective display panels from the viewing point P of the viewer 2, for example, as shown in FIG. 19, in the region L3 of the front-side display panel 101 where the two-dimensional image for providing the three-dimensional stereoscopic image is not displayed, it appears as if the frame-like image is displayed or the BM region of the depth-side display panel 102 is viewed in a see-through manner.

Accordingly, in the three-dimensional display device 1 of the invention, for example, the image display region of the front-side display panel 101 and the image display region of the depth-side display panel 102 are made different from each other with respect to the size thereof thus setting image angles of the display panels 101, 102 as viewed from the viewing point P of the viewer equal to each other whereby the above-mentioned lowering of a stereoscopic feeling of an outer peripheral portion of the image display region can be prevented.

EMBODIMENT 1

Figure 3:
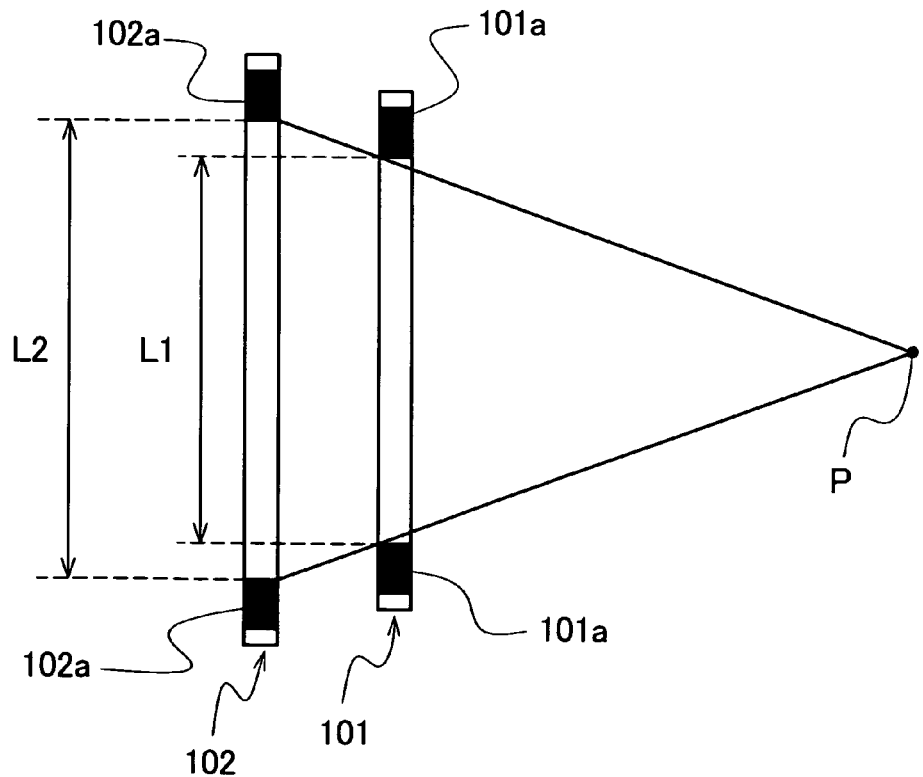
FIG. 3 is a schematic view showing the schematic constitution of the three-dimensional display device of an embodiment 1 according to the invention, and also is a view for explaining the principle of the three-dimensional display device of this embodiment 1.
Figure 4:
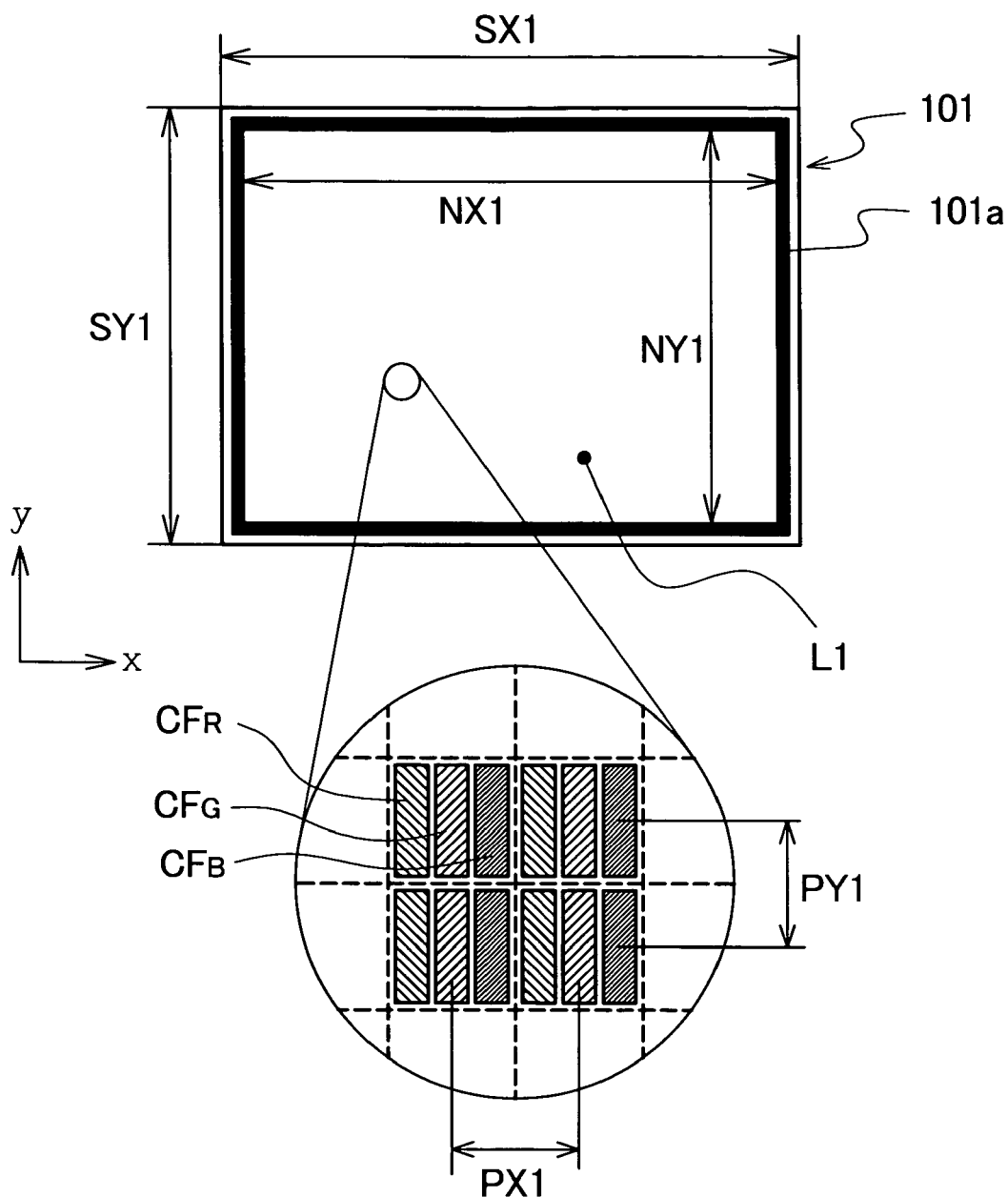
FIG. 4 is a schematic view showing the schematic constitution of the three-dimensional display device of this embodiment 1 according to the invention, and also is a view showing a constitutional example of a front-side display panel.
Figure 5:
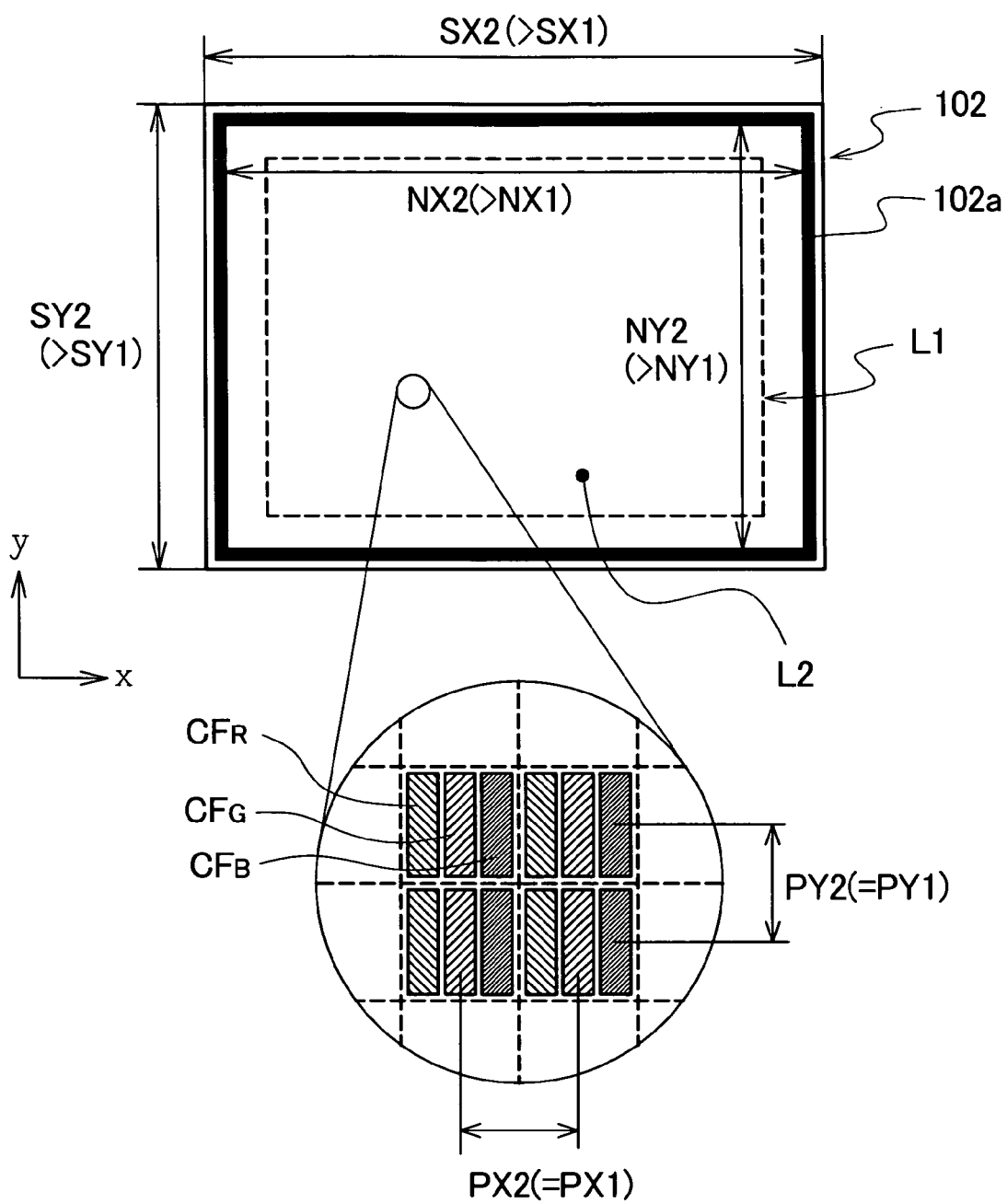
FIG. 5 is a schematic view showing the schematic constitution of the three-dimensional display device of this embodiment 1 according to the invention, and also is a view showing a constitutional example of a depth-side display panel.
Figure 6:
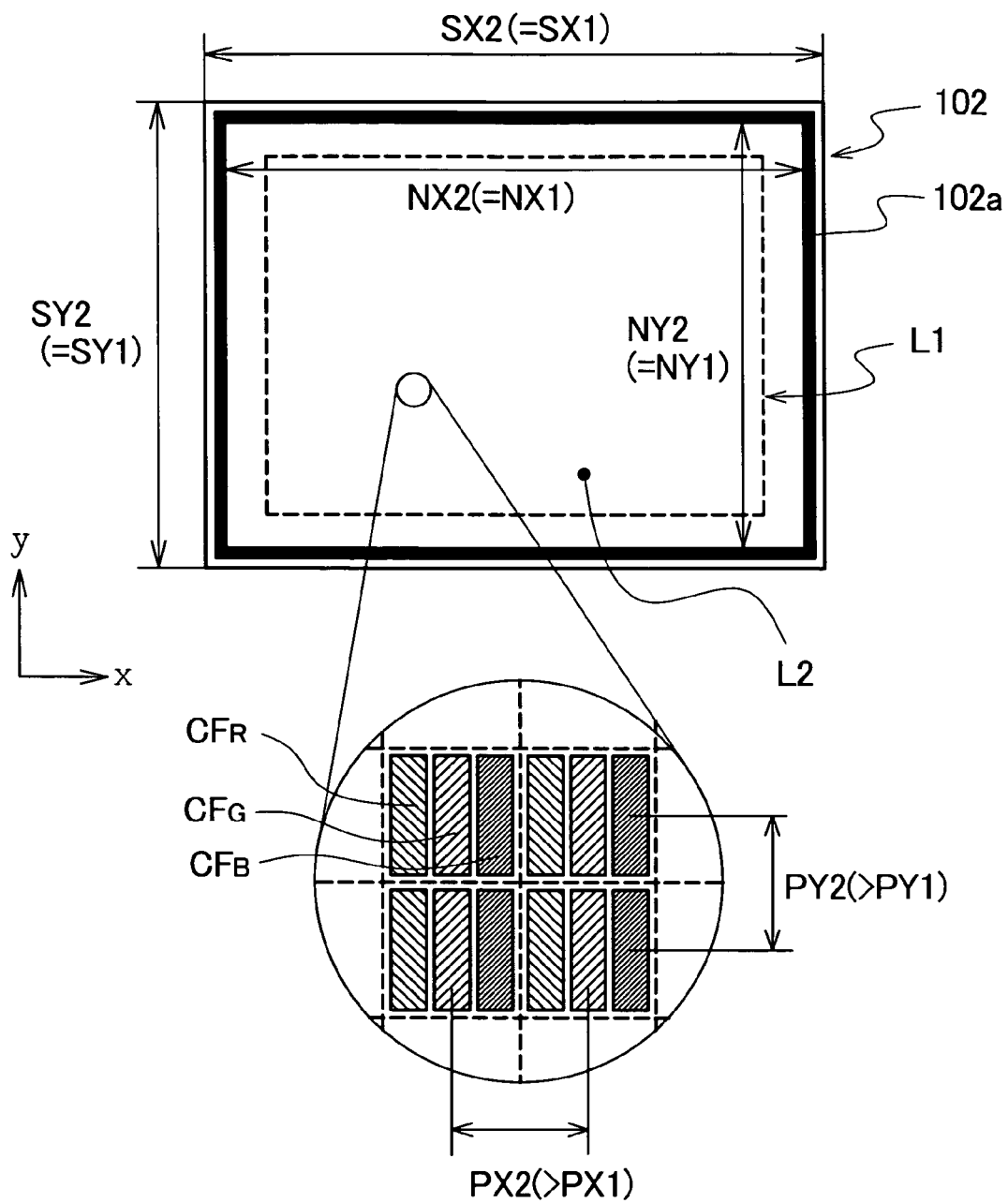
FIG. 6 is a schematic view showing the schematic constitution of the three-dimensional display device of this embodiment 1 according to the invention, and also is a view showing another constitutional example of the depth-side display panel.

FIG. 3 to FIG. 6 are schematic views showing schematic constitutions of a three-dimensional display device of an embodiment 1 according to the invention. FIG. 3 is a view for explaining the principle of the three-dimensional display device of this embodiment 1. FIG. 4 is a view showing a constitutional example of a front-side display panel. FIG. 5 is a view showing a constitutional example of a depth-side display panel. FIG. 6 is a view showing another constitutional example of the depth-side display panel.

In FIG. 3 to FIG. 6, numeral 101a indicates a BM region of the front-side display panel 101, numeral 102a indicates a BM region of the depth-side display panel 102, symbol L1 indicates an image display region of the front-side display panel and symbol L2 indicates an image display region of the depth-side display panel. Further, in FIG. 4, symbols PX1, PY1 respectively indicate a pixel pitch in the x direction and a pixel pitch in the y direction, symbols NX1, NY1 respectively indicate the number of pixels in the x direction and the number of pixels in the y direction, and symbols SX1, SY1 respectively indicate a profile size in the x direction and a profile size in the y direction. Further, in FIG. 5 and FIG. 6, symbols PX2, PY2 respectively indicate a pixel pitch in the x direction and a pixel pitch in the y direction, symbols NX2, NY2 respectively indicate the number of pixels in the x direction and the number of pixels in the y direction, and symbols SX2, SY2 respectively indicate a profile size in the x direction and a profile size in the y direction.

In the three-dimensional display device 1 of this embodiment 1, for example, as shown in FIG. 3, the image display region L1 of the front-side display panel 101 and the image display region L2 of the depth-side display panel 102 differ from each other. Further, it is assumed that the image display region L1 of the front-side display panel 101 has the image angle as viewed from the viewing point P of the viewer set equal to the corresponding image angle of the image display region L2 of the depth-side display panel 102.

Further, the front-side display panel 101 includes, for example, as shown in FIG. 3 and FIG. 4, the BM region 101a on the outer periphery of the image display region L1. That is, in the front-side display panel 101, a region on which the two-dimensional image can be displayed is only the image display region L1. Here, within the image display region L1, the pixels for displaying the two-dimensional image are arranged in a two-dimensional array. Assuming that the color of the each point (pixel) of the two-dimensional image is expressed by three primary colors of R (red), G (green) and B (blue), for example, as shown in FIG. 4, a red color filter $CF_R$, a green color filter $CF_G$, a blue color filter $CF_B$ are provided for each unit pixel. Here, in FIG. 4, a region which is surrounded by a broken line of an enlarged circular potion constitutes one pixel, wherein the pixel pitches in the x direction and the y direction are respectively set to PX1, PY1. The resolution of the front-side display panel 101, that is, the number of pixels in the x direction and the number of pixels in the y direction in the image display region L1 are respectively set to NX1, NY1. Further, the profile sizes of the front-side display panel 101 in the x direction and in the y direction are respectively set to SX1, SY2.

Further, the front-side display panel 102 also includes, for example, as shown in FIG. 3 and FIG. 5, the BM region 102a on the outer periphery of the image display region L2. That is, in the depth-side display panel 102, a region on which the two-dimensional image can be displayed is only the image display region L2. Here, also within the image display region L2, the pixels for displaying the two-dimensional image are arranged in a two-dimensional array. Assuming that the color of the each point (pixel) of the two-dimensional image is expressed by three primary colors of R (red), G (green) and B (blue), for example, as shown in FIG. 5, a red color filter $CF_R$, a green color filter $CF_G$, a blue color filter $CF_B$ are provided for each unit pixel. Here, in FIG. 5, a region which is surrounded by a broken line of an enlarged circular potion constitutes one pixel, wherein the pixel pitches in the x direction and the y direction are respectively set to PX2 and PY2, and PX2 has relationships with PX1, PX2 such that PX2=PX1, PY2=PY1.

Here, since the image display region L2 of the depth-side display panel 102 is larger than the image display region L1 of the front-side display panel 101, the resolution of the depth-side display panel 102, that is, the number of pixels in the x direction and the number of pixels in the y direction are respectively set to NX2, NY2, wherein the relationships NX2>NX1, NY2>NY1 are established. Further, the profile sizes of the depth-side display panel 102 in the x direction and in the y direction are respectively set to SX2, SY2, wherein the relationships SX2>SX1, SY2>SY1 are established.

Here, when the front-side display panel 101 shown in FIG. 4 and the depth-side display panel 102 shown in FIG. 5 are used, for example, the resolution and the profile size of the front-side display panel 101 are set to the resolution and the profile size of the general display panel which is used in the conventional three-dimensional display device and, the depth-side display panel 102 which increases the resolution and increases the profile size correspondingly may be provided. To the contrary, the resolution and the profile size of the depth-side display panel 102 are set to the resolution and the profile size of the general display panel which is used in the conventional three-dimensional display device and, the front-side display panel 101 which decreases the resolution and decreases the profile size correspondingly may be provided.

In the three-dimensional display device of this embodiment 1, the front-side display panel 101 shown in FIG. 4 and the depth-side display panel 102 shown in FIG. 5 are arranged in the depth direction in an overlapped manner. Here, the respective display panels 101, 102 have, as shown in FIG. 3, the image angles of the respective image display regions L1, L2 as viewed from the viewing point P of the viewer equal to each other. Accordingly, when the depth-side display panel 102 is viewed from the viewing point P of the viewer through the image display region L1 of the front-side display panel 101, the region which is viewed is only the image display region L2 of the depth-side display panel 102. Accordingly, when the three-dimensional stereoscopic image of the object is provided by displaying the two-dimensional images of the object to the respective display panels 101, 102, it is possible to eliminate a phenomenon that it appears as if a frame-like image is displayed on an outer peripheral portion of the image display region L1 of the front-side display panel 101 or a phenomenon that the BM region 102a of the depth-side display panel 102 is viewed in a see-through manner. As a result, when the three-dimensional stereoscopic image is provided (displayed), it is possible to prevent the lowering of the stereoscopic feeling of the vicinity of the outer periphery of the image display region.

Further, in the three-dimensional display device of this embodiment 1, as the depth-side display panel 102, in place of using the display panel which sets the pixel pitch, that is, the size of one pixel thereof equal to the pixel pitch or the size of one pixel of the front-side display panel 101 as shown in FIG. 5, it is possible to use the display panel which sets the resolution, that is, the number of pixels thereof equal to the resolution, that is, the number of pixels of the front-side display panel 101.

When the display panel which sets the number of pixels thereof equal to the number of pixels of the front-side display panel 101 as the depth-side display panel 102, the depth-side display panel 102 possesses, for example, as shown in FIG. 6, NX2, NY2 as the number of pixels in the x direction and in the y direction in the image display region L2, wherein the relationships NX2=NX1, NY2=NY1 are established. Here, since the image display region L2 of the depth-side display panel 102 is larger than the image display region L1 of the front-side display panel 101, as shown in FIG. 6, the pixel pitches PX2, PY2 in the x direction and in the y direction of the depth-side display panel 102 are respectively assume the relationships PX2>PX1, PY2>PY1. Further, when the pixel pitch of the depth-side display panel 102 is increased, as shown in FIG. 6, it is preferable to increase the area of each pixel.

Here, when the front-side display panel 101 shown in FIG. 4 and the depth-side display panel 102 shown in FIG. 6 are used, for example, the pixel pitch and the profile size of the front-side display panel 101 are set to the pixel pitch and the profile size of the general display panel which is used in the conventional three-dimensional display device and, the depth-side display panel 102 which broadens the pixel pitch and increases the profile size correspondingly may be provided. To the contrary, the pixel pitch and the profile size of the depth-side display panel 102 are set to the pixel pitch and the profile size of the general display panel which is used in the conventional three-dimensional display device and, the front-side display panel 101 which decreases the pixel pitch and decreases the profile size correspondingly may be provided.

In using the display panel shown in FIG. 6 as the depth-side display panel 102, when the respective display panels 101, 102 are viewed from the viewing point P of the viewer, the image angle of each pixel of the front-side display panel 101 agrees with the image angle of each pixel of the depth-side display panel 102. Accordingly, when the two-dimensional images of the object are displayed on the respective display panels 101, 102, the pixels which display the same point (position) of the object appear in an overlapped manner and hence, a discomfort that the viewer feels when the viewer views the three-dimensional stereoscopic image of the object is reduced.

As has been explained above, according to the three-dimensional display device of this embodiment 1, when the viewer views the three-dimensional display device 1 from the viewing point P of the viewer, the region which is viewed through the image display region L1 of the front-side display panel 101 is only the image display region L2 of the depth-side display panel 102. Accordingly, it is possible to eliminate the phenomenon that it appears as if the frame-like image is displayed in the vicinity of the outer periphery of the front-side display panel 101 or the phenomenon that the BM region 102a of the depth-side display panel 102 is viewed in a see-through manner. As a result, when the three-dimensional stereoscopic image is provided, it is possible to prevent the lowering of the stereoscopic feeling or the lowering of image quality of the vicinity of the outer periphery of the image display region L1.

Further, in changing the profile sizes of the display panels in conformity with the sizes of the image display regions L1, L2 of the respective display panels 101, 102 as in the case of the three-dimensional display device of this embodiment 1, with the use of the general display panel which is used in the conventional three-dimensional display device as the depth-side display panel 102, it is possible to decrease the profile size of the front-side display panel 101 and hence, the three-dimensional display device becomes light-weighted.

Further, in this embodiment 1, the three-dimensional display device 1 which includes two display panels 101, 102 is taken as an example. However, the invention is not limited to such a constitution and the three-dimensional display device may include three or more display panels. Also when the three-dimensional display device may include three or more display panels, by gradually increasing the image display regions toward the depth-side display panel from the front-side display panel as viewed from a viewer and, at the same time, by setting the image angles of the respective image display regions as viewed from the viewing point of the viewer equal to each other, the three-dimensional display device can obtain the substantially equal advantageous effects as the three-dimensional display device of this embodiment 1.

EMBODIMENT 2

Figure 7:
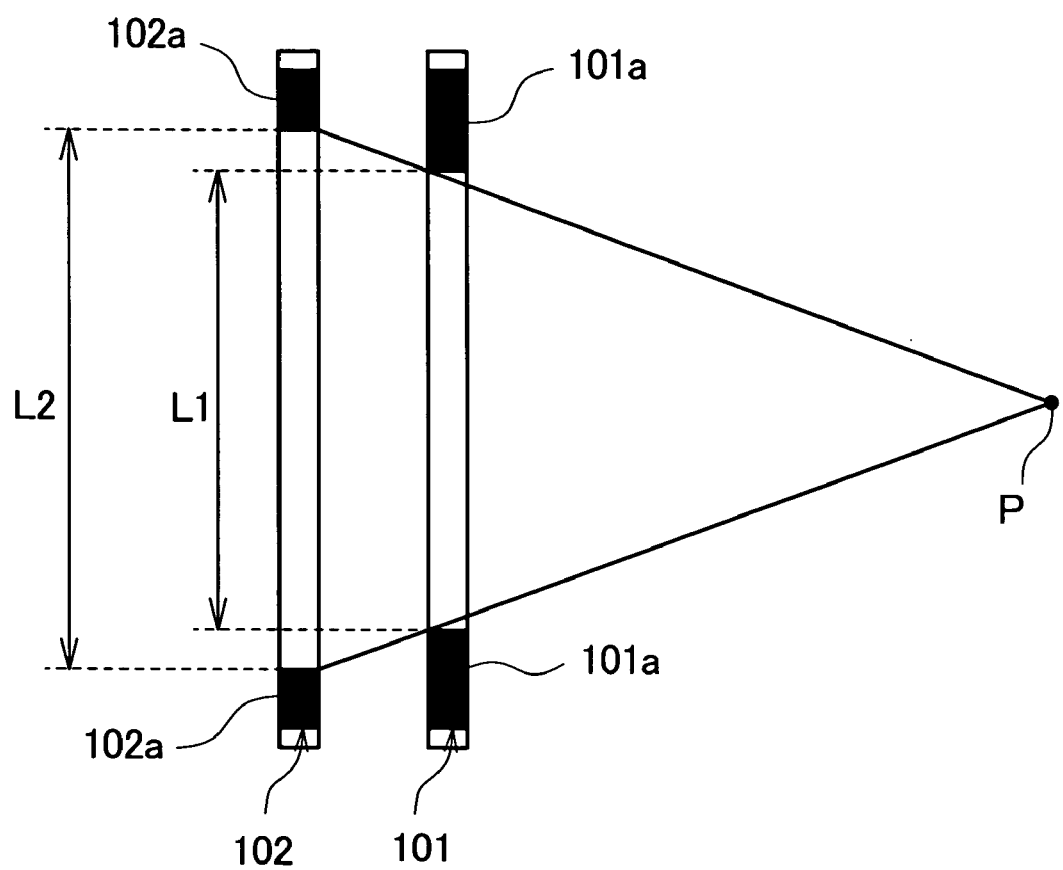
FIG. 7 is a schematic view showing the schematic constitution of a three-dimensional display device of an embodiment 2 according to the invention, and also is a view for explaining the principle of the three-dimensional display device of the embodiment 2.
Figure 8:
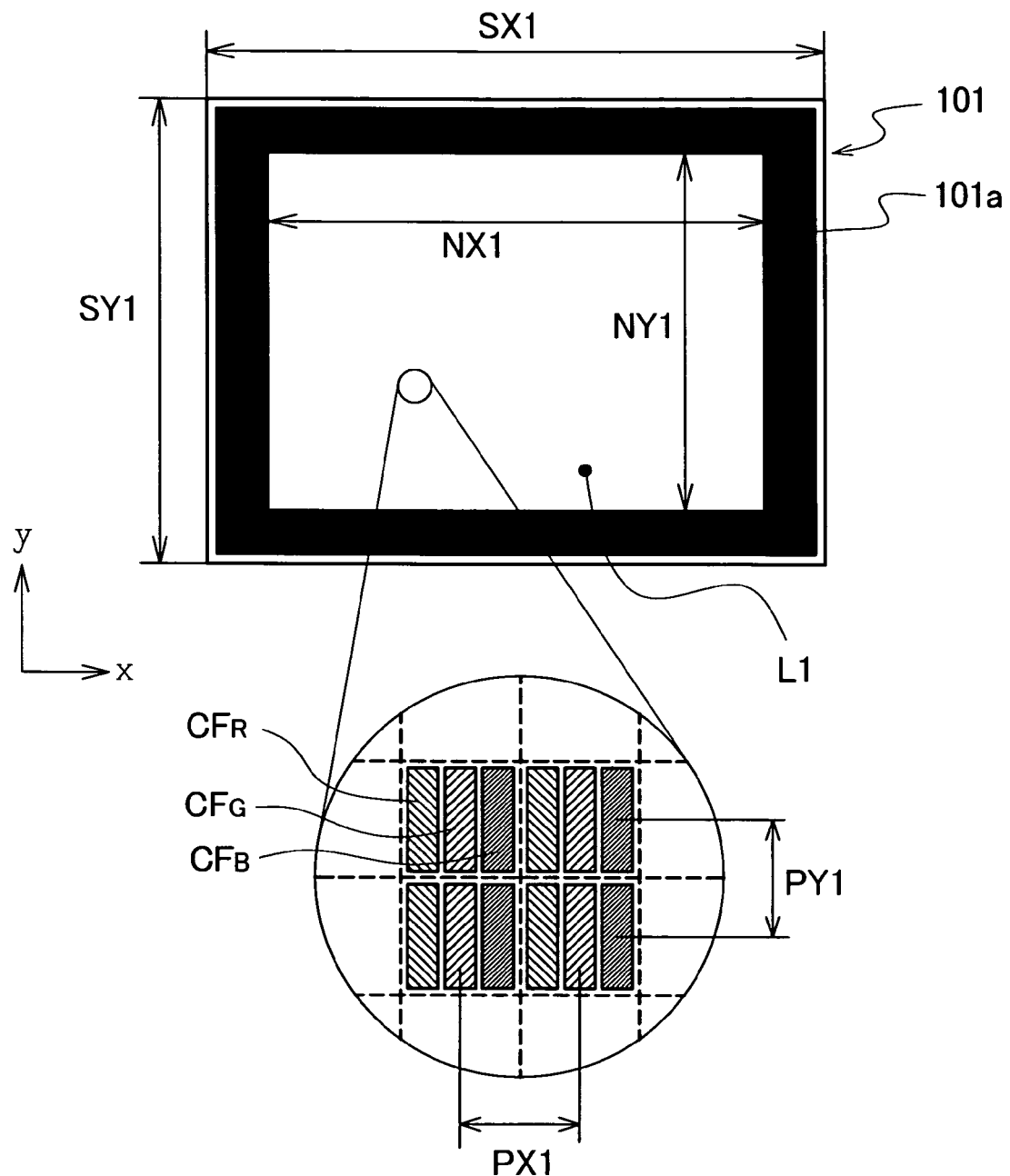
FIG. 8 is a schematic view showing the schematic constitution of the three-dimensional display device of the embodiment 2 according to the invention, and also is a view showing a constitutional example of a front-side display panel.
Figure 9:
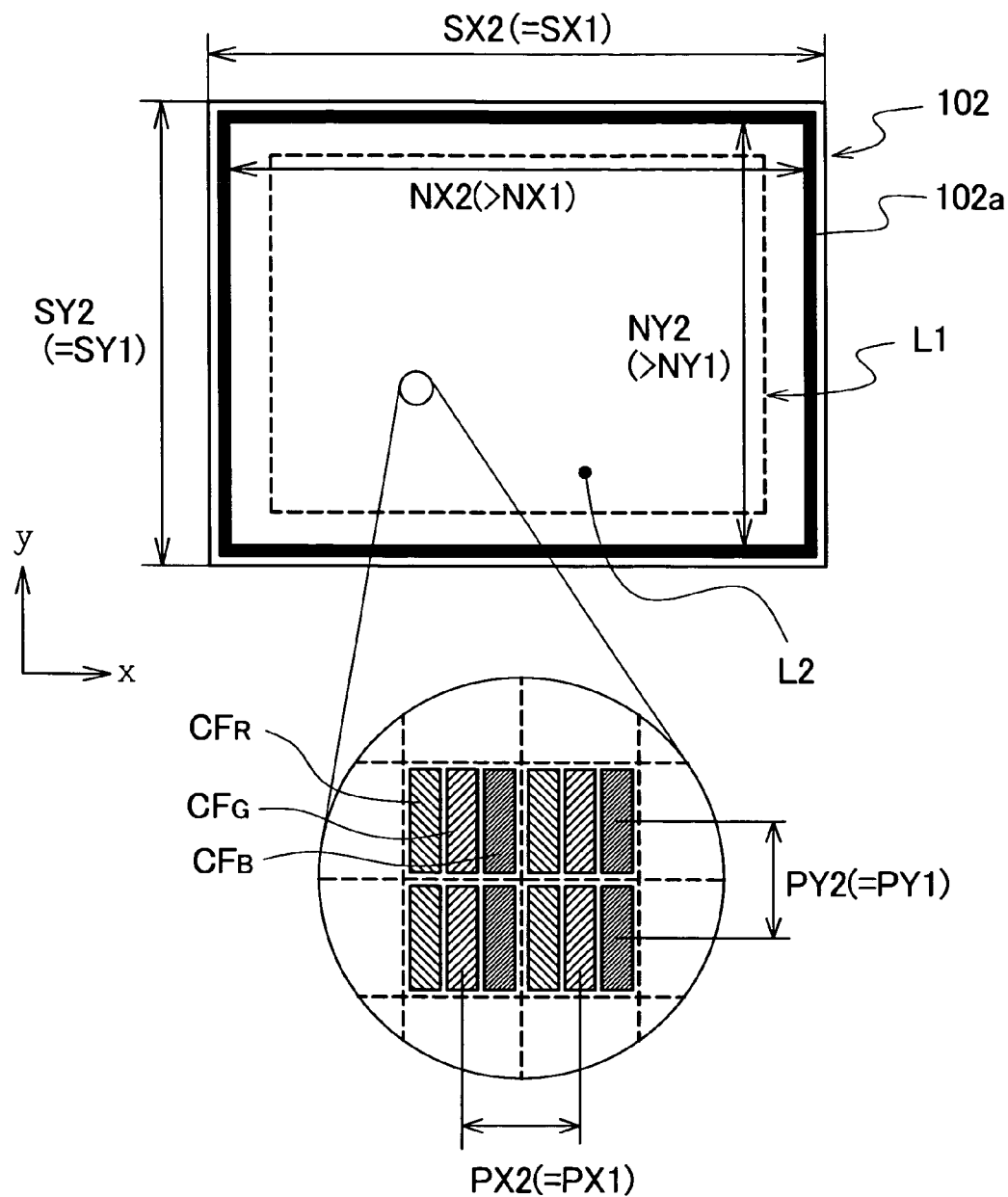
FIG. 9 is a schematic view showing the schematic constitution of the three-dimensional display device of the embodiment 2 according to the invention, and also is a view showing a constitutional example of a depth-side display panel.
Figure 10:
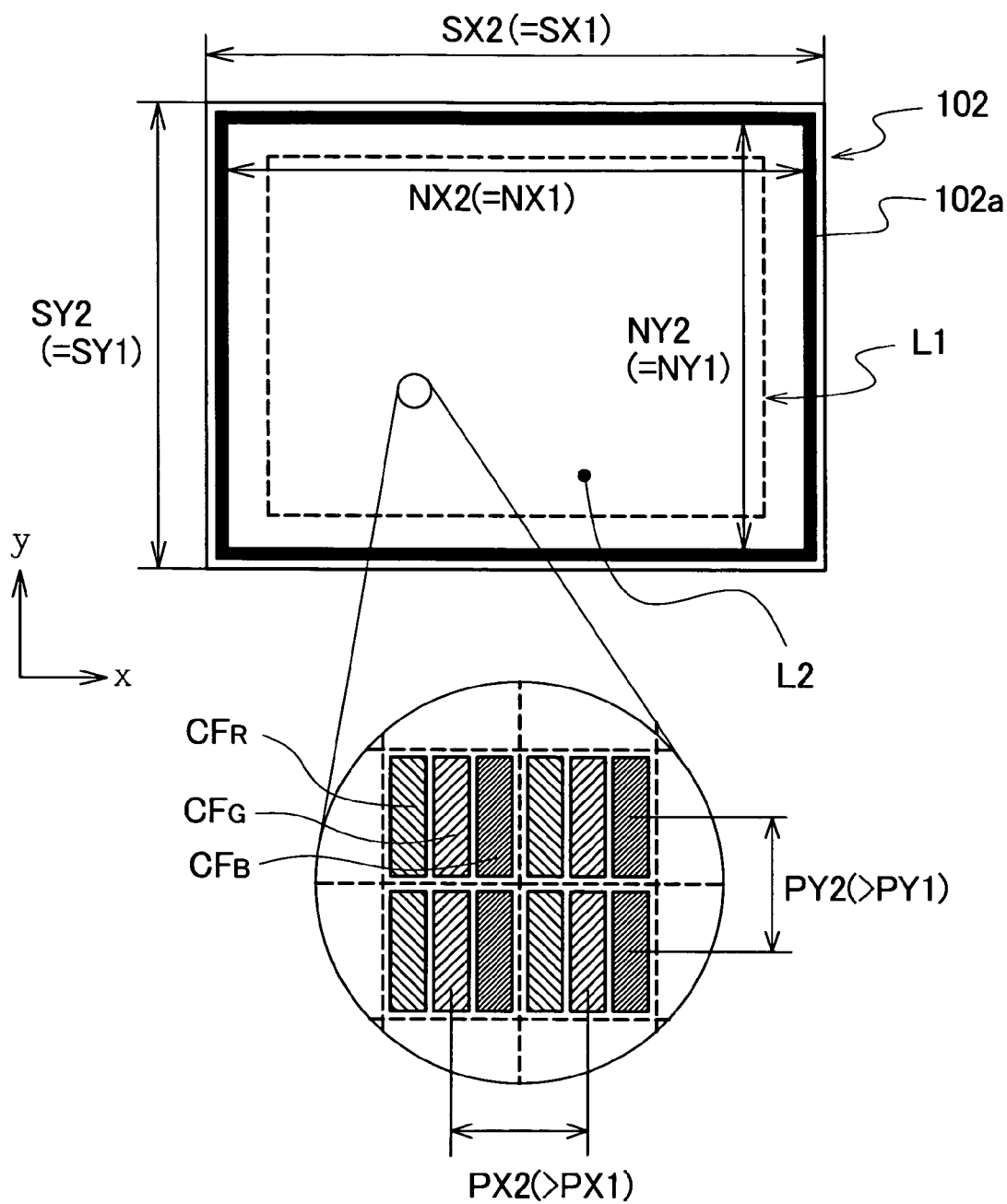
FIG. 10 is a schematic view showing the schematic constitution of the three-dimensional display device of the embodiment 2 according to the invention, and also is a view showing another constitutional example of the depth-side display panel.

FIG. 7 to FIG. 10 are schematic views showing schematic constitutions of a three-dimensional display device of an embodiment 2 according to the invention. FIG. 7 is a view for explaining the principle of the three-dimensional display device of the embodiment 2. FIG. 8 is a view showing a constitutional example of a front-side display panel. FIG. 9 is a view showing a constitutional example of a depth-side display panel. FIG. 10 is a view showing another constitutional example of the depth-side display panel.

In the three-dimensional display device 1 of this embodiment 2, for example, as shown in FIG. 7, the image display region L1 of the front-side display panel 101 and the image display region L2 of the depth-side display panel 102 differ from each other. Further, it is assumed that the image display region L1 of the front-side display panel 101 has the image angle as viewed from the viewing point P of the viewer set equal to the corresponding image angle of the image display region L2 of the depth-side display panel 102.

Further, the front-side display panel 101 includes, for example, as shown in FIG. 7 and FIG. 8, the BM region 101a on the outer periphery of the image display region L1. That is, in the front-side display panel 101, a region on which the two-dimensional image can be displayed is only the image display region L1. Here, within the image display region L1, the pixels for displaying the two-dimensional image are arranged in a two-dimensional array. Assuming that the each point (pixel) of the two-dimensional image is expressed by three primary colors of R (red), G (green) and B (blue), for example, as shown in FIG. 8, a red color filter $CF_R$, a green color filter $CF_G$, a blue color filter $CF_B$ are provided for each pixel unit. Here, in FIG. 8, a region which is surrounded by a broken line of an enlarged circular potion constitutes one pixel, wherein the pixel pitches in the x direction and the y direction are respectively set to PX1, PY1. The resolution of the front-side display panel 101, that is, the number of pixels in the x direction and the number of pixels in the y direction in the image display region L1 are respectively set to NX1, NY1. Further, the profile sizes of the front-side display panel 101 in the x direction and the profile size in the y direction are respectively set to SX1, SY1.

Further, the depth-side display panel 102 also includes, for example, as shown in FIG. 9, the BM region 102a on the outer periphery of the image display region L2. That is, in the depth-side display panel 102, a region on which the two-dimensional image can be displayed is only the image display region L2. Here, also within the image display region L2, the pixels for displaying the two-dimensional image are arranged in a two-dimensional array. Assuming that each point (pixel) of the two-dimensional image is expressed by three primary colors of R (red), G (green) and B (blue), for example, as shown in FIG. 9, a red color filter $CF_R$, a green color filter $CF_G$, a blue color filter $CF_B$ are provided for each pixel unit. Here, in FIG. 9, a region which is surrounded by a broken line of an enlarged circular potion constitutes one pixel, wherein the pixel pitches in the x direction and the y direction are respectively set to PX2 and PY2, and PX2 has relationships with PX1, PX2 such that PX2=PX1, PY2=PY1.

Here, since the image display region L2 of the depth-side display panel 102 is larger than the image display region L1 of the front-side display panel 101, the resolution of the depth-side display panel 102, that is, the number of pixels in the x direction and the number of pixels in the y direction of the image display region L2 are respectively set to NX2, NY2, wherein the relationships NX2>NX1, NY2>NY1 are established.

The constitution makes the three-dimensional display device of this embodiment 2 different from the three-dimensional display device of the first embodiment lies in that, for example, as shown in FIG. 7 and FIG. 9, when the profile size of the depth-side display panel 102 in the x direction and the profile size in the y direction are respectively set to SX2, SY2, the relationships SX2=SX1, SY2=SY1 are established. Accordingly, in the front-side display panel 101, a width of the BM region 101a is broadened to decrease the image display region L1.

Here, when the front-side display panel 101 shown in FIG. 8 and the depth-side display panel 102 shown in FIG. 9 are used, it is preferable that a general display panel used in the conventional three-dimensional display device is used as the depth-side display panel 102, and the front-side display panel 101 which broadens the width of the BM region 101a in conformity with an arrangement distance between the respective display panels 101, 102 is used.

In the three-dimensional display device of this embodiment 2, the front-side display panel 101 shown in FIG. 8 and the depth-side display panel 102 shown in FIG. 9 are arranged in the depth direction in an overlapped manner. Here, the respective display panels 101, 102 have, as shown in FIG. 7, the image angles of the respective image display regions L1, L2 as viewed from the viewing point P of the viewer equal to each other. Accordingly, when the depth-side display panel 102 is viewed from the viewing point P of the viewer through the image display region L1 of the front-side display panel 101, the region which is viewed is only the image display region L2 of the depth-side display panel 102. Accordingly, when the three-dimensional stereoscopic image of the object is provided by displaying the two-dimensional images of the object to the respective display panels 101, 102, it is possible to eliminate a phenomenon that it appears as if a frame-like image is displayed on an outer peripheral portion of the image display region L1 of the front-side display panel 101 or a phenomenon that the BM region 102a of the depth-side display panel 102 is viewed in a see-through manner. As a result, when the three-dimensional stereoscopic image is provided (displayed), it is possible to prevent the lowering of the stereoscopic feeling and an image quality of the vicinity of the outer periphery of the image display region.

Further, in the three-dimensional display device of this embodiment 2, as the depth-side display panel 102 can, in place of using the display panel which sets the pixel pitch (the size of one pixel) thereof equal to the pixel pitch (the size of one pixel) of the front-side display panel 101 as shown in FIG. 9, it is possible to use the display panel which sets the resolution (the number of pixels) thereof equal to the resolution (the number of pixels) of the front-side display panel 101.

When the display panel which sets the number of pixels thereof equal to the number of pixels of the front-side display panel 101 as the depth-side display panel 102, the depth-side display panel 102 possesses, for example, as shown in FIG. 10, NX2, NY2 as the number of pixels in the x direction and in the y direction in the image display region L2, wherein the relationships NX2=NX1, NY2=NY1 are established. Here, since the image display region L2 of the depth-side display panel 102 is larger than the image display region L1 of the front-side display panel 101, as shown in FIG. 10, the pixel pitches PX2, PY2 in the x direction and in the y direction of the depth-side display panel 102 respectively assume the relationships PX2>PX1, PY2>PY1. Further, when the pixel pitch of the depth-side display panel 102 is increased, as shown in FIG. 10, it is preferable to increase the area of each pixel.

Here, when the front-side display panel 101 shown in FIG. 8 and the depth-side display panel 102 shown in FIG. 10 are used, in the actual display device, it is preferable that the general display panel which is used in the conventional three-dimensional display device is used as the depth-side display panel 102, and the front-side display panel 101 which broadens the width of the BM region 101a in conformity with the arrangement distance between the respective display panels 101, 102 and decreases the pixel pitch is prepared.

In using the display panel shown in FIG. 10 as the depth-side display panel 102, when the respective display panels 101, 102 are viewed from the viewing point P of the viewer, the image angle of each pixel of the front-side display panel 101 agrees with the image angle of each pixel of the depth-side display panel 102. Accordingly, when the two-dimensional images of the object are displayed on the respective display panels 101, 102, the pixels which display the same point (position) of the object appear in an overlapped manner and hence, a discomfort that the viewer feels when the viewer views the three-dimensional image of the object is reduced.

As has been explained above, according to the three-dimensional display device of this embodiment 2, when the viewer views the three-dimensional display device 1 from the viewing point P of the viewer, the region which is viewed through the image display region L1 of the front-side display panel 101 is only the image display region L2 of the depth-side display panel 102. Accordingly, it is possible to eliminate the phenomenon that it appears as if the frame-like image is displayed in the vicinity of the outer periphery of the front-side display panel 101 or the phenomenon that the BM region 102a of the depth-side display panel 102 is viewed in a see-through manner. As a result, when the three-dimensional stereoscopic image is provided, it is possible to prevent the lowering of the stereoscopic feeling of the vicinity of the outer periphery of the image display region L1.

Further, when the profile sizes of the respective display panels 101, 102 are equal to each other as in the case of the three-dimensional display device of this embodiment 2, with the use of the general display panel which is used in the conventional three-dimensional display device as the depth-side display panel 102, it is sufficient to merely broaden the width of the BM region 101a of the front-side display panel 101 and hence, the three-dimensional display device can be easily manufactured.

Further, when the profile sizes of the respective display panels 101, 102 are equal, in assembling the three-dimensional display device, the display device can be assembled in the same manner as the conventional three-dimensional display device. Particularly, by arranging the profile sizes of the respective display panels as in the case of this embodiment 2, the operability such as positioning can be enhanced. Further, it is possible to directly use a frame member which integrally holds the respective display panels, a backlight and the like without modification.

Further, in this embodiment 2, the three-dimensional display device which includes two display panels 101, 102 is taken as an example. However, the invention is not limited to such a constitution and the three-dimensional display device may include three or more display panels. Also when the three-dimensional display device may include three or more display panels, by gradually increasing the image display regions toward the depth-side display panel from the front-side display panel as viewed from the viewer by changing the widths of the BM regions of the respective display panels and, at the same time, by setting the image angles of the respective image display regions as viewed from the viewing point of the viewer equal to each other, the three-dimensional display device can obtain the substantially equal advantageous effects as the three-dimensional display device of this embodiment 2.

EMBODIMENT 3

Figure 11:
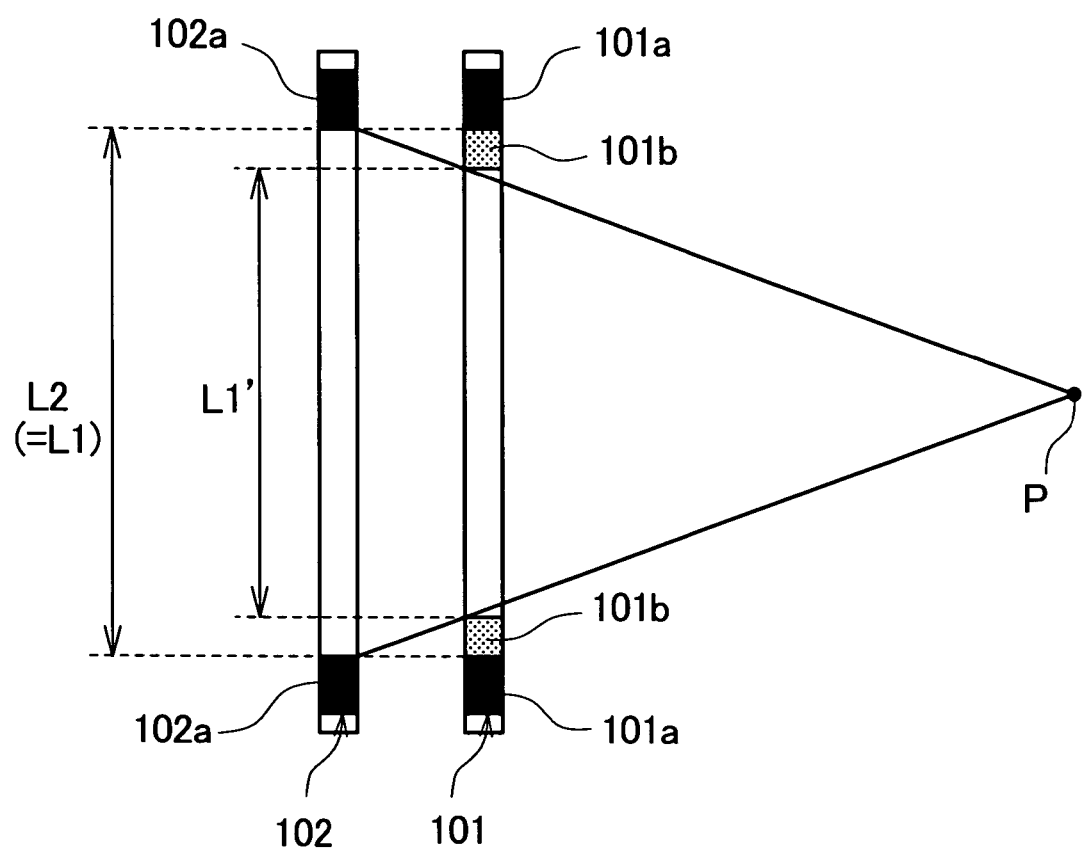
FIG. 11 is a schematic view showing the schematic constitution of a three-dimensional display device of an embodiment 3 according to the invention, and also is a view for explaining the principle of the three-dimensional display device of the embodiment 3.
Figure 12:
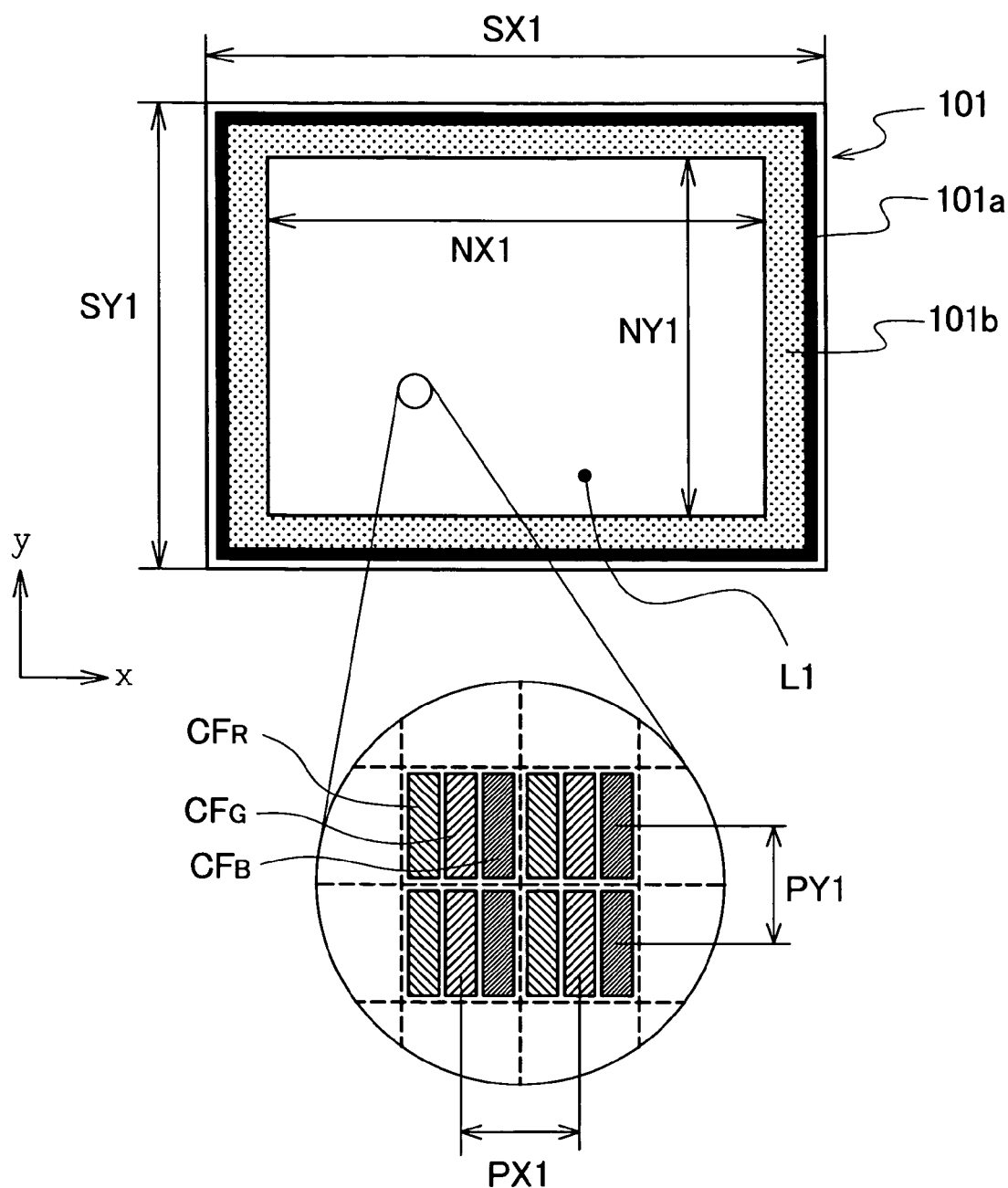
FIG. 12 is a schematic view showing the schematic constitution of the three-dimensional display device of the embodiment 3 according to the invention, and also is a view showing a constitutional example of a front-side display panel.
Figure 13:
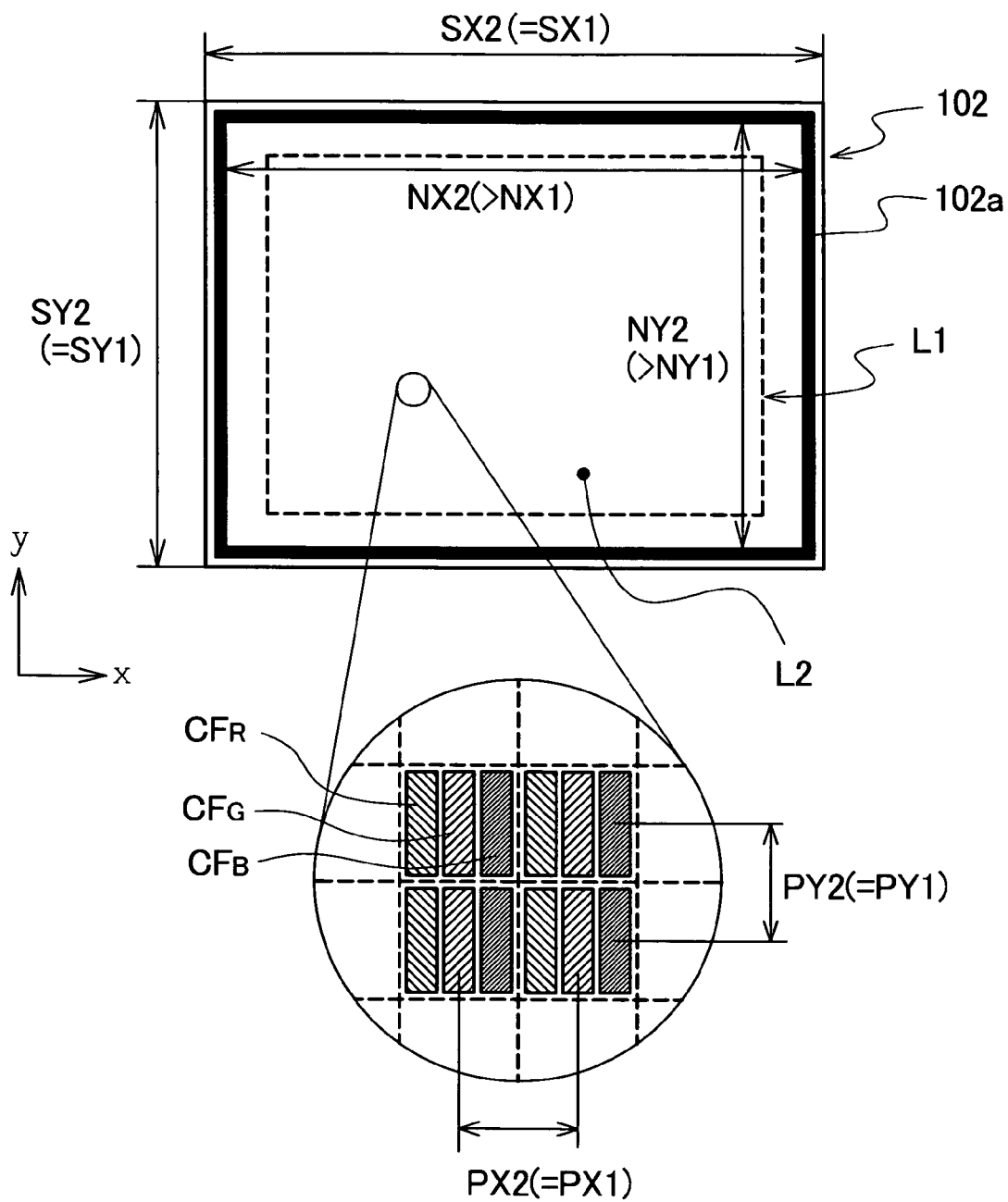
FIG. 13 is a schematic view showing the schematic constitution of the three-dimensional display device of the embodiment 3 according to the invention, and also is a view showing a constitutional example of a depth-side display panel.
Figure 14:
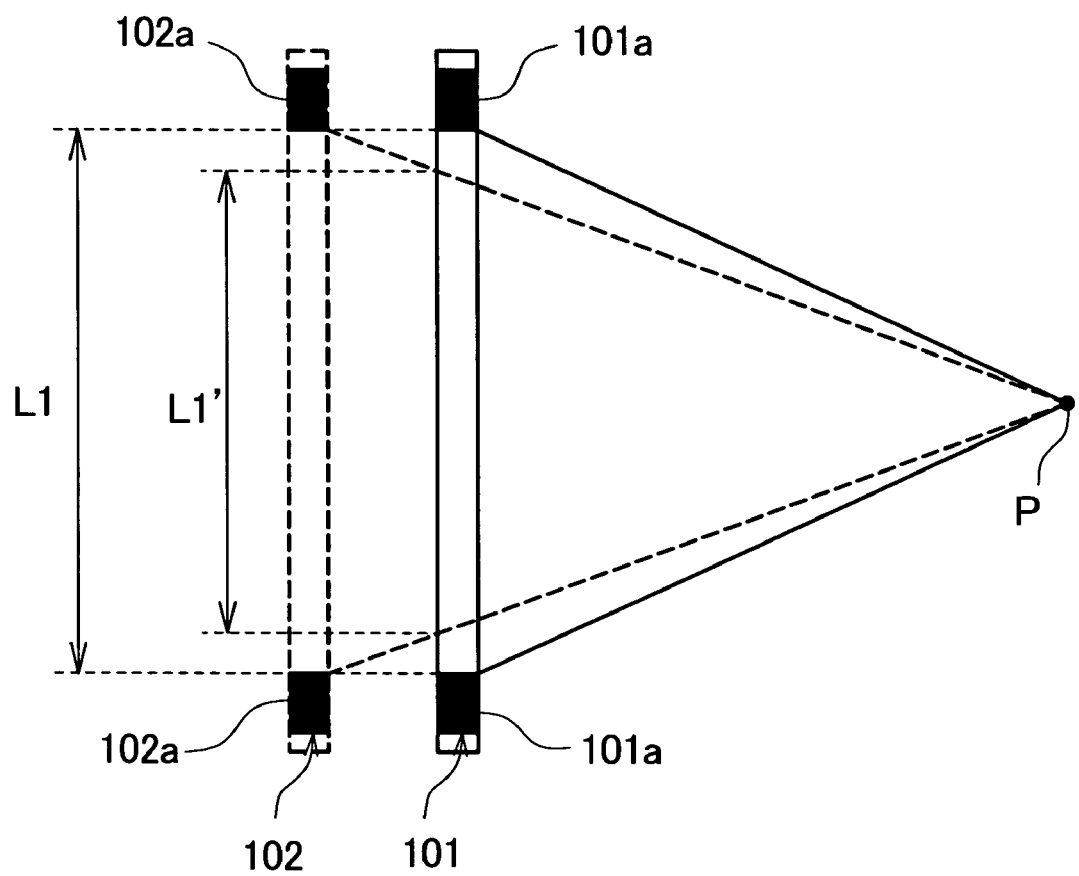
FIG. 14 is a schematic view showing the schematic constitution of the three-dimensional display device of the embodiment 3 according to the invention, and also is a view for explaining one advantageous effect of the embodiment 3.

FIG. 11 to FIG. 14 are schematic views showing schematic constitutions of a three-dimensional display device of an embodiment 3 according to the invention. FIG. 11 is a view for explaining the principle of the three-dimensional display device of the embodiment 3. FIG. 12 is a view showing a constitutional example of a front-side display panel. FIG. 13 is a view showing a constitutional example of a depth-side display panel. FIG. 14 is a view for explaining one advantageous effect of the embodiment 3.

In the three-dimensional display device 1 of this embodiment 3, for example, as shown in FIG. 11, the image display region L1 of the front-side display panel 101 and the image display region L2 of the depth-side display panel 102 are equal to each other. However, in displaying a three-dimensional stereoscopic image of an object using the respective display panels 101, 102, for example, as shown in FIG. 11, by providing a scaling region 101b which performs a black display in the vicinity of an outer periphery of the image display region L1 of the front-side display panel 101, it is possible to reduce the image display region in appearance. Here, it is assumed that the apparent image display region L1' of the front-side display panel 101 has the image angle as viewed from the viewing point P of the viewer set equal to the corresponding image angle of the image display region L2 of the depth-side display panel 102.

Further, the front-side display panel 101 includes, for example, as shown in FIG. 11 and FIG. 12, the BM region 101a on the outer periphery of the image display region L1. That is, in the front-side display panel 101, although a region on which the two-dimensional image can be displayed is the image display region L1, the region on which a two-dimensional image for providing a three-dimensional stereoscopic image of the object is displayed is only the apparent image display region L1'. Here, within the image display region L1, the pixels for displaying the two-dimensional image are arranged in a two-dimensional array. Assuming that the color of the each point (pixel) of the two-dimensional image is expressed by three primary colors of R (red), G (green) and B (blue), for example, as shown in FIG. 12, a red color filter $CF_R$, a green color filter $CF_G$, a blue color filter $CF_B$ are provided for each pixel unit. Here, in FIG. 12, a region which is surrounded by a broken line of an enlarged circular potion constitutes one pixel, wherein the pixel pitches in the x direction and the y direction are respectively set to PX1, PY1. Further, the number of pixels in the x direction and the number of pixels in the y direction of the apparent image display region L1' of the front-side display panel 101 are respectively set to NX1, NY1. Further, the profile size of the front-side display panel 101 in the x direction and the profile size in the y direction are respectively set to SX1, SY2.

Further, the depth-side display panel 102 also includes, for example, as shown in FIG. 11 and FIG. 13, the BM region 102a on the outer periphery of the image display region L2. That is, in the depth-side display panel 102, a region on which the two-dimensional image can be displayed is only the image display region L2. Here, also within the image display region L2, the pixels for displaying the two-dimensional image are arranged in a two-dimensional array. Assuming that the color of each point (pixel) of the two-dimensional image is expressed by three primary colors of R (red), G (green) and B (blue), for example, as shown in FIG. 13, a red color filter $CF_R$, a green color filter $CF_G$, a blue color filter $CF_B$ are provided for each pixel unit. Here, in FIG. 13, a region which is surrounded by a broken line of an enlarged circular potion constitutes one pixel, wherein the pixel pitches in the x direction and the y direction are respectively set to PX2 and PY2, and PX2 has relationships with PX1, PY1 such that PX2=PX1, PY2=PY1.

Further, the image display region L2 of the depth-side display panel 102 is equal to the image display region L1 of the front-side display panel 101 and hence, the image display region L2 is larger than the apparent image display region L1'. Here, the resolution of the depth-side display panel 102, that is, the number of pixels in the x direction and the number of pixels in the y direction of the image display region L2 are respectively set to NX2, NY2, wherein the relationships NX2>NX1 and NY2>NY1 are established. Further, the profile sizes of the depth-side display panel 102 in the x direction and in the y direction are respectively SX2, SY2, wherein the relationships SX2=SX1 and SY2=SY1 are established.

In the three-dimensional display device of this embodiment 3, the front-side display panel 101 shown in FIG. 12 and the depth-side display panel 102 shown in FIG. 13 are arranged in the depth direction in an overlapped manner. Here, the respective display panels 101, 102 have, as shown in FIG. 11, the image angle of the apparent image display region L1' of the front-side display panel 101 and the image angle of the image display region L2 of the depth-side display panel 102 as viewed from the viewing point P of the viewer set equal to each other. Accordingly, when the depth-side display panel 102 is viewed from the viewing point P of the viewer through the apparent image display region L1' of the front-side display panel 101, the region which is viewed is only the image display region L2 of the depth-side display panel 102. Accordingly, when the three-dimensional stereoscopic image of the object is provided by displaying the two-dimensional images of the object to the respective display panels 101, 102, it is possible to eliminate a phenomenon that it appears as if a frame-like image is displayed on an outer peripheral portion of the apparent image display region L1' of the front-side display panel 101 or a phenomenon that the BM region 102a of the depth-side display panel 102 is viewed in a see-through manner. As a result, when the three-dimensional stereoscopic image is provided, it is possible to prevent the lowering of the stereoscopic feeling and an image quality of the vicinity of the outer periphery of the image display region.

Further, the three-dimensional display device according to the invention may be used in the same manner as the general two-dimensional display device by displaying an image only on the frontmost display panel out of a plurality of display panels which are arranged in the depth direction, for example. In this case, the image display regions, for example, the whole screens of the display panels other than the display panel on which the image is displayed may perform a white display, for example.

In the three-dimensional display device of the embodiment 3, as shown in FIG. 11 and FIG. 12, the scaling region 101b to which the black display is applied is provided to the outer peripheral portion of the image display region L1 of the front-side display panel 101 such that the scaling region 101b appears as if the BM region 101a thus decreasing the apparent image display region L1'. Accordingly, when the three-dimensional display device is used as a two-dimensional display device, for example, as shown in FIG. 14, by preventing the black display of the scaling region 101b, it is possible to use the whole image display region L1 of the front-side display panel 101 for displaying of the image.

In the three-dimensional display device described in the embodiment 1 and the embodiment 2, the image display region L1 per se of a front-side display panel 101 is set smaller than the image display region L2 of the depth-side display panel 102. Accordingly, when the three-dimensional display device is used in a way that the two-dimensional display device is used by displaying the image only on the front-side display panel 101, the image to be displayed becomes small. Accordingly, as in the case of the embodiment 3, by performing the black display of the scaling region 101b only at the time of displaying the three-dimensional stereoscopic image of the object thus decreasing the apparent image display region L1' of the front-side display panel 101, when the three-dimensional display device is used in a way that the two-dimensional display device is used, it is possible to perform the large display of the image using the image display region L1 including the scaling region 101b.

Figure 15:
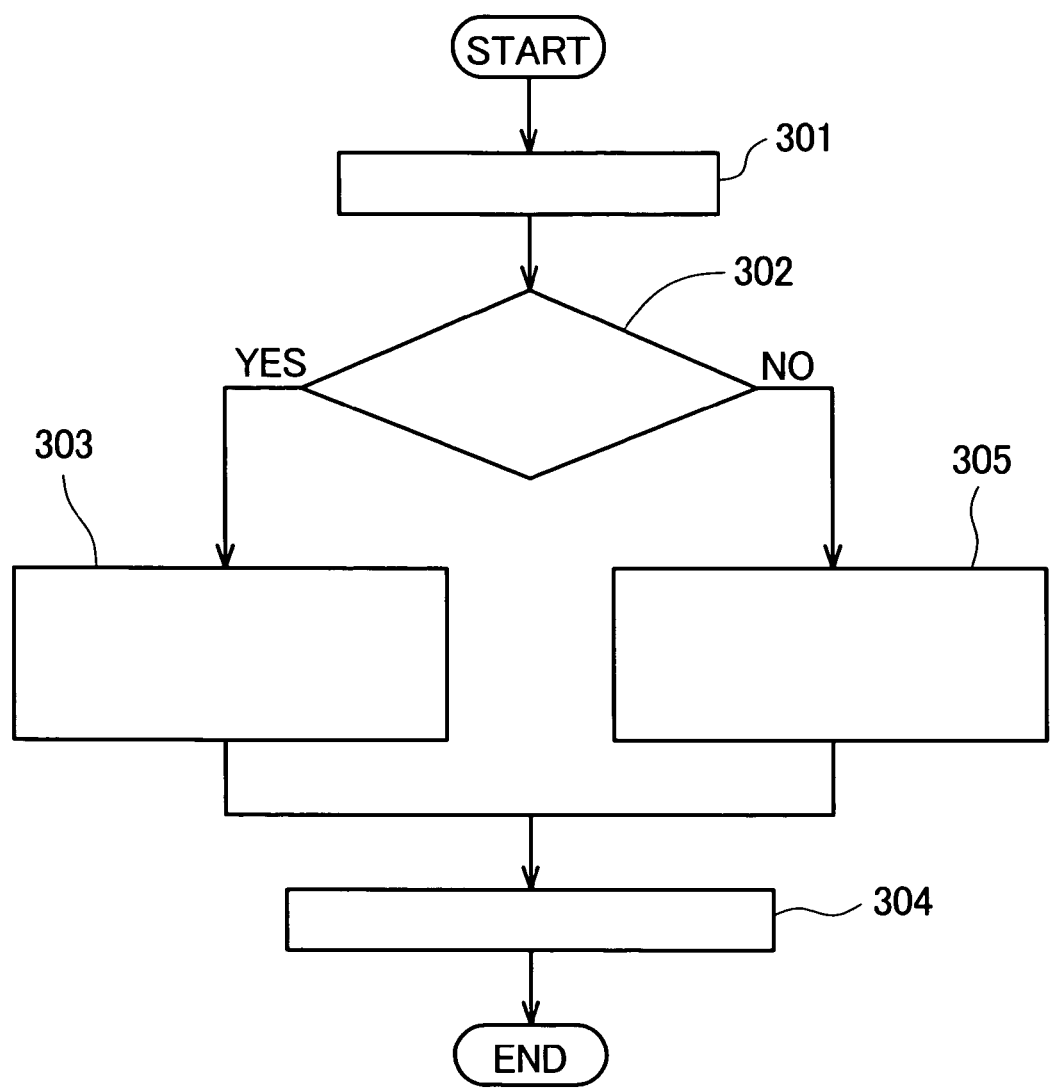
FIG. 15 is a schematic view for explaining the schematic constitution of a three-dimensional display method and a three-dimensional display system using the three-dimensional display device of the embodiment 3, and also is a flow chart for explaining a three-dimensional display method at a time of scaling at a step of generating a two-dimensional image.
Figure 16:
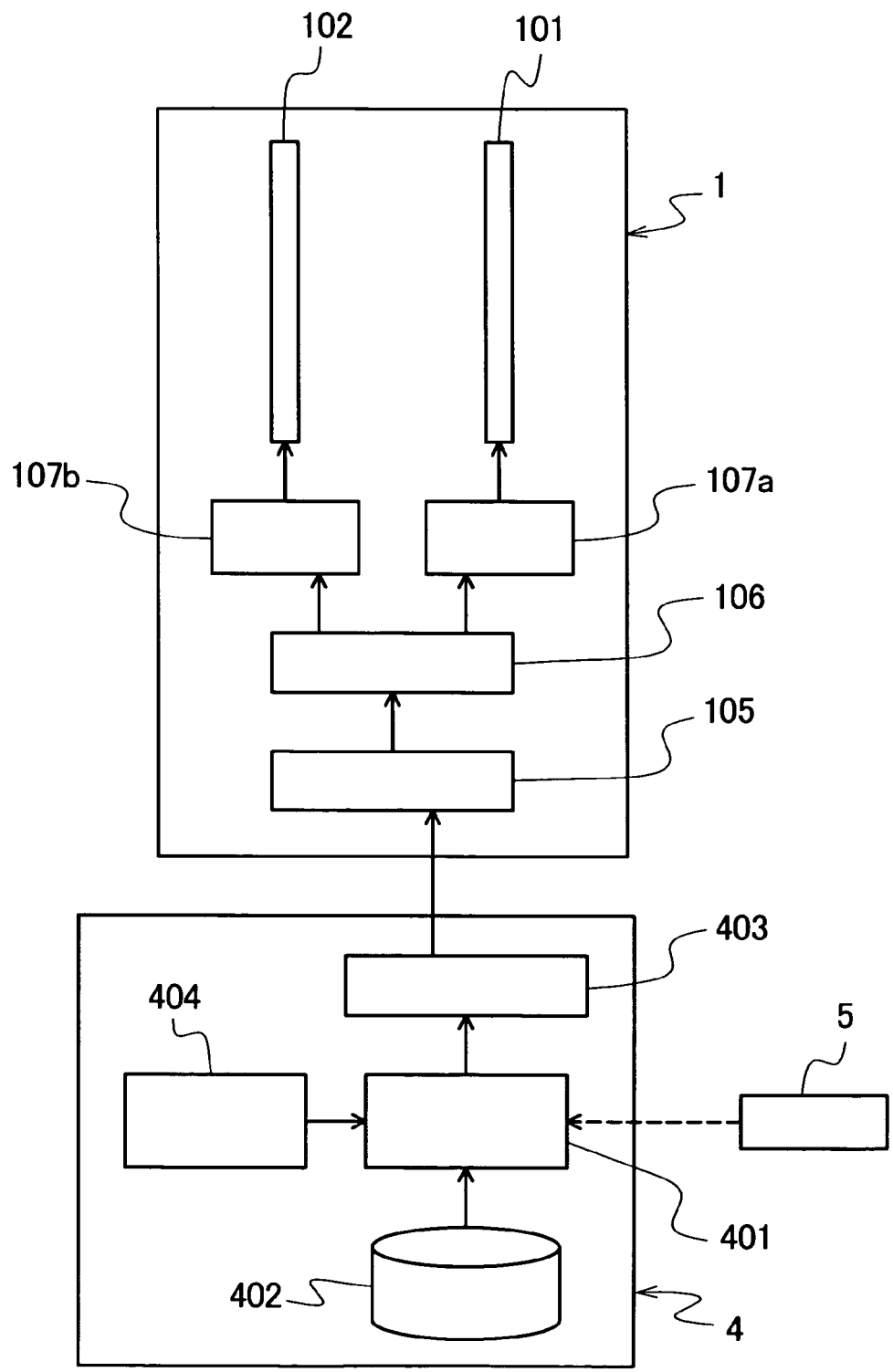
FIG. 16 is a schematic view for explaining the schematic constitution of a three-dimensional display method and a three-dimensional display system using the three-dimensional display device of the embodiment 3, and also is a block diagram showing a constitutional example of a system at a time of displaying the three-dimensional stereoscopic image along the flow shown in FIG. 15.
Figure 17:
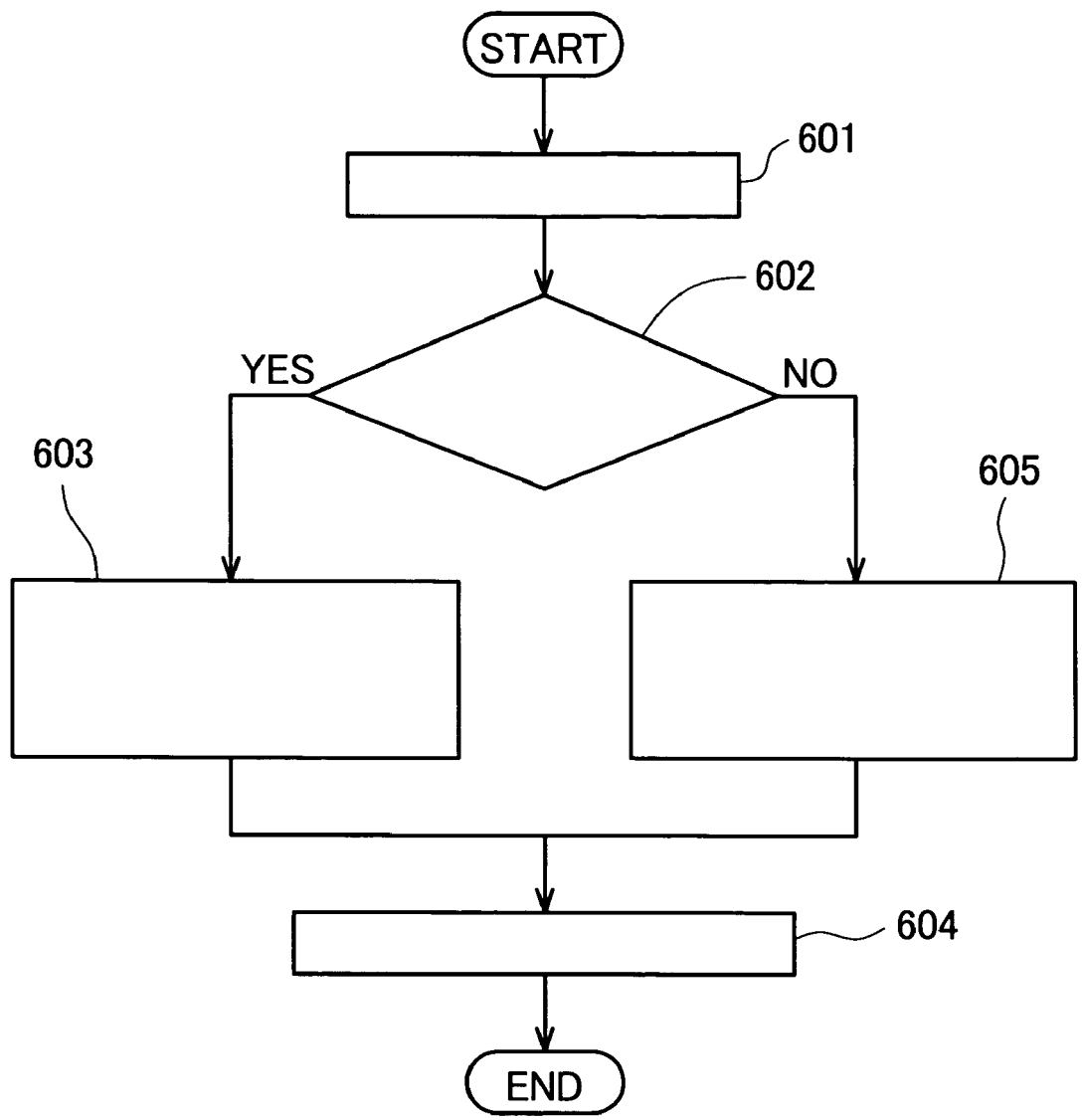
FIG. 17 is a schematic view for explaining the schematic constitution of a three-dimensional display method and a three-dimensional display system using the three-dimensional display device of the embodiment 3, and also is a flow chart for explaining a three-dimensional display method at a time of scaling at a step of displaying a two-dimensional image.
Figure 18:
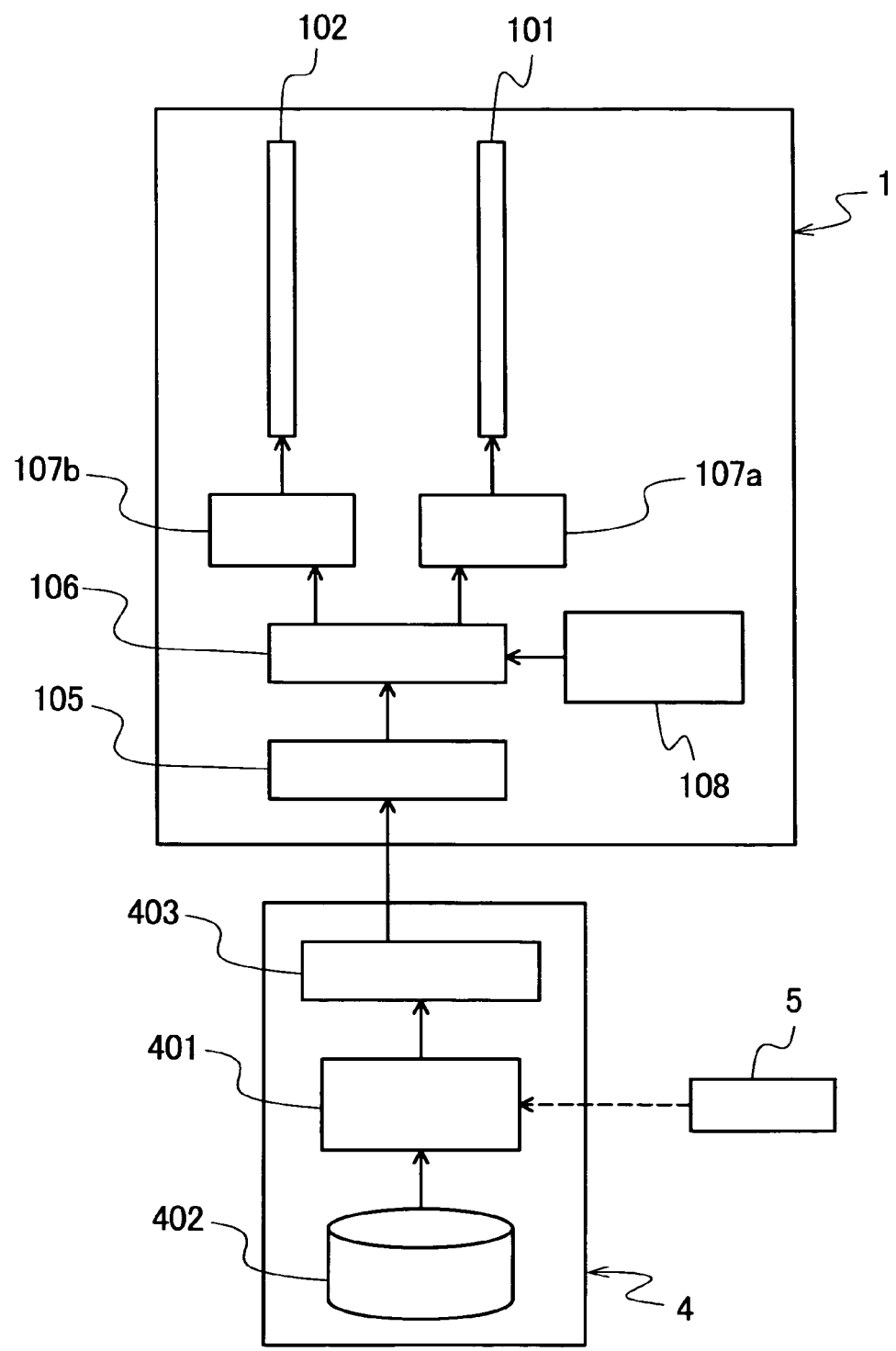
FIG. 18 is a schematic view for explaining the schematic constitution of a three-dimensional display method and a three-dimensional display system using the three-dimensional display device of the embodiment 3, and also is a block diagram showing a constitutional example of a system at a time of displaying the three-dimensional stereoscopic image along the flow shown in FIG. 17.

FIG. 15 to FIG. 18 are schematic views for explaining the schematic constitution of a three-dimensional display method and a three-dimensional display system which use the three-dimensional display device of the embodiment 3. FIG. 15 is a flow chart for explaining a three-dimensional display method when scaling is performed at a stage of forming a two-dimensional image, FIG. 16 is a block diagram showing a constitutional example of a system at the time of displaying the three-dimensional stereoscopic image along the flow shown in FIG. 15, FIG. 17 is a flow chart for explaining a three-dimensional display method when scaling is performed at a stage of displaying a two-dimensional image, and FIG. 18 is a block diagram showing a constitutional example of a system at a time of displaying the three-dimensional stereoscopic image along the flow shown in FIG. 17.

In reducing the apparent image display region L1' of the front-side display panel 101 by providing the scaling region 101b as in the case of the three-dimensional display device of this embodiment 3, roughly two methods, that is, a method which performs scaling at a stage that the two-dimensional images are displayed on the respective display panels 101, 102 and a method which performs scaling at a stage that the respective two-dimensional images are displayed by the three-dimensional display device are considered.

In performing the scaling at the stage that the two-dimensional images are formed, for example, the scaling region 101b is set by a two-dimensional-image forming device such as a PC (personal computer). Here, first of all, as shown in FIG. 15, the image (two-dimensional image) displayed by the three-dimensional display device 1 is formed (step 301). Then, whether the image formed in step 301 is an image for displaying a three-dimensional stereoscopic image of an object or not is determined (step 302). Here, the image which displays the three-dimensional stereoscopic image of the object is formed, the scaling region 101b is set by a method which changes color information of the outer peripheral portion of the image to be displayed on the front-side display panel 101 to black or the like (step 303). Then, image data to be displayed on the display panels including the image which sets the scaling region 101b is transmitted to the three-dimensional display device 1 as image signals (step 304). Here, among the image signals which are received by the three-dimensional display device 1, with respect to the image signals on the two-dimensional image to be displayed on the front-side display panel 101, since the scaling region 101b is already set, by directly displaying the two-dimensional image without modification in the same manner as the conventional three-dimensional display device, the apparent image display region L1' of the front-side display panel 101 becomes small.

Further, when the image formed in step 301 is, for example, formed of only the image displayed on the front-side display panel 101, that is, when the three-dimensional display device is used in a same manner that the two-dimensional display device is used, as the image to be displayed on the depth-side display panel 102, the white image is formed on the whole screen of the depth-side display panel 102 (step 305). Then, the image data which is generated in step 301 and step 305 is transmitted to the above-mentioned three-dimensional display device 1 as image signals (step 304).

In reducing the apparent image display region L1' of the front-side display panel 101 using such a method, the two-dimensional image forming device 4 may include, for example, as shown in FIG. 16, a two-dimensional image forming means 401 which forms a two-dimensional image, an object data holding means 402 which holds three-dimensional data of an object, an image signal transmitting means 403 which transmits image signals of the two-dimensional image generated by the two-dimensional image forming means 401 to the three-dimensional display device 1, and a scaling means 404 which sets the scaling region 101*b*.

Further, the three-dimensional display device 1 includes, as shown in FIG. 16, an image signal receiving means 105 which receives the image signals from the two-dimensional image forming means 4, a signal processing means 106 which processes the received image signals, and a first drive means 107*a*, a second drive means 107*b* which drive the respective display panels 101, 102. Here, the signal processing means 106 is, for example, a printed circuit board which includes circuits such as a timing controller, for example, while the first drive means 107*a*, the second drive means 107*b* are, for example, constituted of a driver IC for driving liquid crystal.

In displaying the three-dimensional image of the object using the three-dimensional display system which includes the three-dimensional display device 1 and the two-dimensional image forming device 4 having the constitutions shown in FIG. 16, for example, an object to be displayed or a position of a viewing point are designated using an inputting means 5 such as a mouse or a keyboard. Here, the two-dimensional image forming means 401 of the two-dimensional image forming device 4 reads out three-dimensional data of the object which is designated by the inputting means 5 from an object data holding means 402, and forms a two-dimensional image which is obtained by projecting the object to the respective display panels from the designated viewing point. Here, the generated images are the two-dimensional images for displaying the three-dimensional stereoscopic image and hence, the two-dimensional image forming means 401 sets the scaling region 101*b* in the two-dimensional image to be displayed on the front-side display panel 101 using the scaling means 404. Then, the formed two-dimensional image is transmitted as image signals from the image signal transmitting means 403.

The image signals of the two-dimensional image transmitted from the image signals transmitting means 403 are received by the image signals receiving means 105 of the three-dimensional display device 1. Then, in the signal processing means 106, the image signals are transmitted to the first drive means 107*a* and the second drive means 107*b* while controlling timings for allowing the front-side display panel 101 and the depth-side display panel 102 to display the two-dimensional images. Then, the first drive means 107*a* and the second drive means 107*b* drive the pixels of the respective display panels 101, 102 based on the signals transmitted from the signals processing means 106 to display the two-dimensional images.

In such a method, the three-dimensional display device 1 may have the same constitution as the conventional three-dimensional display device.

In performing the scaling at the stage that the two-dimensional images are displayed in the three-dimensional display device 1, for example, as shown in FIG. 17, when the image signals are received by the three-dimensional display device 1 (step 601), whether the received image signals are image signals which display the three-dimensional stereoscopic image of the object or not is determined (step 602). Here, when the image signals which display the three-dimensional stereoscopic image of the object are received, the scaling region 101*b* is set by a method which changes color information of the outer peripheral portion of the image to be displayed on the front-side display panel 101 into black or the like (step 603). Then, the image including the image which sets the scaling region 101*b* is displayed on respective display panels (604).

Further, when the image which is received in step 601 is, for example, formed of only the image displayed on the front-side display panel 101, that is, when the three-dimensional display device is used in a way that the two-dimensional display device is used, as the image to be displayed on the depth-side display panel 102, the three-dimensional display device is set such that the white image is formed on the whole screen of the depth-side display panel 102 (step 605). Then, the image which sets the scaling region 101*b* is displayed on the front-side display panel 101 and the white image is displayed on the whole screen of the depth-side display panel 102 (step 604).

In reducing the apparent image display region L1' of the front-side display panel 101 using such a method, the two-dimensional image forming device 4 may include, for example, as shown in FIG. 18, a two-dimensional image forming means 401 which forms a two-dimensional image, the object data holding means 402 which holds three-dimensional data of an object, and the image signal transmitting means 403 which transmits image signals of the two-dimensional image generated by the two-dimensional image forming means 401 to the three-dimensional display device 1.

Further, the three-dimensional display device 1 includes, as shown in FIG. 18, an image signal receiving means 105 which receives the image signals from the two-dimensional image forming device 4, a signal processing means 106 which processes the received image signals, and a first drive means 107*a*, a second drive means 107*b* which drive the respective display panels 101, 102. Further, the three-dimensional display device 1 also includes a scaling means 108 which sets the scaling region 101*b*. Here, the signals processing means 106 is, for example, a printed circuit board which includes circuits such as a timing controller, for example, while the first drive means 107*a*, the second drive means 107*b* are, for example, constituted of a driver IC for driving liquid crystal. Further, the scaling means 108 may be formed on a printed circuit board which includes circuits such as a timing controller or the like or may be formed as other independent printed circuit board.

In displaying the three-dimensional image of the object using the three-dimensional display system which includes the three-dimensional display device 1 and the two-dimensional image forming device 4 having the constitutions shown in FIG. 18, for example, an object to be displayed or a position of a viewing point are designated using an inputting means 5 such as a mouse or a keyboard. Here, the two-dimensional image forming means 401 of the two-dimensional image forming device 4 reads out three-dimensional data of the object which is designated by the inputting means 5 from the object data holding means 402, and forms a two-dimensional image which is obtained by projecting the object to the respective display panels from the designated viewing point. Then, the formed two-dimensional image is transmitted as image signals from the image signal transmitting means 403.

The image signals of the two-dimensional image transmitted from the image signals transmitting means 403 are received by the image signal receiving means 105 of the three-dimensional display device 1. Then, in the signal processing means 106, the image signals are transmitted to the first drive means 107*a* and the second drive means 107*b* while controlling timings for allowing the front-side display panel 101 and the depth-side display panel 102 to display the two-dimensional images. Here, when the received image signals are image signals which are provided for displaying the three-dimensional stereoscopic image of the object, the scaling region 101b is set by the scaling means 108. Then, the first drive means 107a and the second drive means 107b drive the pixels of the respective display panels 101, 102 based on the signals transmitted from the signals processing means 106 to display the two-dimensional images.

Here, the three-dimensional display systems shown in FIG. 16 and FIG. 18 constitute merely examples and the three-dimensional display system may adopt any constitution provided that, as mentioned previously, the scaling region 101b is set to the two-dimensional image to be displayed on the front-side display panel 101 thus decreasing the apparent image display region L1'.

As has been explained above, according to the three-dimensional display device of this embodiment 3, when the viewer views the three-dimensional display device 1 from the viewing point P of the viewer, the region which is viewed through the apparent image display region L1' of the front-side display panel 101 is only the image display region L2 of the depth-side display panel 102. Accordingly, it is possible to eliminate the phenomenon that it appears as if the frame-like image is displayed in the vicinity of the outer periphery of the front-side display panel 101 or the phenomenon that the BM region 102a of the depth-side display panel 102 is viewed in a see-through manner. As a result, when the three-dimensional stereoscopic image is provided, it is possible to prevent the lowering of the stereoscopic feeling or the lowering of the image quality of the vicinity of the outer periphery of the image display region L1.

Further, in setting the scaling region 101b in the two-dimensional image to be displayed on the front-side display panel 101 thus decreasing the apparent image display region L1' as in the case of the three-dimensional display device of this embodiment 3, as the respective display panels 101, 102, it may be possible to use the general display panel which is used in the conventional three-dimensional display device, that is, a display panel which has the same constitution as the display panel which is used in the conventional three-dimensional display device. Here, by setting the scaling region 101b at a stage of forming the two-dimensional image by the two-dimensional image forming device 4 such as a personal computer, it is possible to directly use the conventional three-dimensional display device without modification.

Further, in this embodiment 3, the three-dimensional display device 1 which includes two display panels 101, 102 is taken as an example. However, the invention is not limited to such a constitution and the three-dimensional display device may include three or more display panels. Also when the three-dimensional display device may include three or more display panels, by gradually increasing the image display regions toward the depth-side display panel from the front-side display panel as viewed from a viewer and, at the same time, by setting the image angles of the respective image display regions as viewed from the viewing point of the viewer equal to each other, the three-dimensional display device can obtain the substantially equal advantageous effects as the three-dimensional display device of this embodiment 3.

Although the invention has been explained specifically in conjunction with the embodiments, it is needless to say that the invention is not limited to the above-mentioned embodiments and various modifications can be made without departing from the gist of the invention.

The invention claimed is:

1. A display device in which a plurality of matrix-type display panels are arranged from a front side to a back side in an overlapped manner and an image is displayed on the respective display panels, wherein the front side display panel include a front side display region, and the back side display panel includes a back side display region, wherein a pixel pitch of the front side display region is smaller than a pixel pitch of the back side display region, and wherein the respective display panels are equal to each other with respect to the number of pixels.

2. A display device according to claim 1, wherein a size of the front side display region is smaller than a size of the back side display region.

3. A display device according to claim 1, wherein a three-dimensional stereoscopic image is displayed as a whole by displaying two-dimensional images on the respective display panels.

4. A display device according to claim 1, wherein a three-dimensional stereoscopic image is displayed as a whole by displaying two-dimensional images on the respective display panels.

5. A display device according to claim 2, wherein a three-dimensional stereoscopic image is displayed as a whole by displaying two-dimensional images on the respective display panels.

6. A display device according to claim 1, wherein the respective display panels differ from each other with respect to sizes thereof.

* * * * *